(12) United States Patent
Greiff et al.

(10) Patent No.: US 11,885,894 B2
(45) Date of Patent: Jan. 30, 2024

(54) 2022-LARGE-SCALE COOPERATIVE POSITIONING WITH GLOBAL NAVIGATION SATELLITE SYSTEM

(71) Applicant: Mitsubishi Electric Research Laboratories, Inc., Cambridge, MA (US)

(72) Inventors: Marcus Greiff, Cambridge, MA (US); Karl Berntorp, Newton, MA (US); Stefano Di Cairano, Newton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 17/814,122

(22) Filed: Jul. 21, 2022

(65) Prior Publication Data

US 2024/0004088 A1 Jan. 4, 2024

Related U.S. Application Data

(60) Provisional application No. 63/367,497, filed on Jul. 1, 2022.

(51) Int. Cl.
  *G01S 19/51* (2010.01)
  *G01S 19/39* (2010.01)

(52) U.S. Cl.
  CPC ............ *G01S 19/51* (2013.01); *G01S 19/393* (2019.08); *G01S 19/396* (2019.08)

(58) Field of Classification Search
  CPC ....... G01S 19/51; G01S 19/396; G01S 19/393
  USPC .......... 342/357.27, 357.44, 357.12, 357.395, 342/357, 58, 357.66
  See application file for complete search history.

(56) References Cited

U.S. PATENT DOCUMENTS

| | | | |
|---|---|---|---|
| 2021/0131914 A1* | 5/2021 | Ma ......................... | G06N 3/047 |
| 2021/0266748 A1* | 8/2021 | Wei ....................... | H04W 12/69 |

* cited by examiner

*Primary Examiner* — Bo Fan
(74) *Attorney, Agent, or Firm* — Gene Vinokur; Hironori Tsukamoto

(57) ABSTRACT

A system jointly estimates states of GNSS receivers moving in a region using measurements of a Global Navigation Satellite System (GNSS). The system clusters the GNSS receivers into different clusters subject to a constraint on an upper bound on each cluster and executes a set of probabilistic filters corresponding to the set of clusters to estimate the states of GNSS receivers in each cluster. Each probabilistic filter estimates the states of the GNSS receivers in a corresponding cluster by fusing the GNSS data collected from the GNSS receivers in the cluster to jointly reduce an estimation error of each of the GNSS receivers in the cluster. The DES updates the cluster assignments based on a measure of estimation error in the states of different GNSS receivers in different clusters.

18 Claims, 20 Drawing Sheets

2022-LARGE-SCALE COOPERATIVE POSITIONING WITH GLOBAL NAVIGATION SATELLITE SYSTEM

TECHNICAL FIELD

This invention relates broadly to cooperative positioning schemes with Global Navigation Satellite Systems (GNSSs) that involve multiple receivers whose locations are unknown. In particular, the invention relates to finding clusters of such receivers which are permitted to share information through a server, such that the measurements acquired in each cluster benefit the estimation performance while resulting in computationally tractable estimators.

BACKGROUND

A GNSS is a system of satellites that can be used for determining the geographic location of a mobile receiver with respect to the earth. Examples of GNSS include global positioning system (GPS), Galileo, Glonass, Quasi-Zenith Satellite System (QZSS), and BeiDou. Various global navigation satellite (GNS) correction systems are known that are configured for receiving GNSS signal data from the GNSS satellites, processing these GNSS data, calculating GNSS corrections from the GNSS data, and for providing these corrections to a mobile receiver, with the purpose of achieving quicker and more accurate calculation of the mobile receiver's geographic position.

Various position estimation methods are known wherein the position calculations are based on repeated measurement of the so-called pseudo-range and carrier phase observables by Earth-based GNSS receivers. The "pseudo-range" or "code" observable represents a difference between a transmit time of a GNSS satellite signal and a local receive time of this satellite signal, and hence includes the geometric distance covered by the satellite's radio signal. The measurement of an alignment between a carrier wave of the received GNSS satellite signal and a copy of such a signal generated inside the receiver provides another source of information for determining the apparent distance between the satellite and the receiver. The corresponding observable is called the "carrier phase", which represents an integrated value of the Doppler frequency due to the relative motion of the transmitting satellite and the receiver.

Any pseudo-range observation inevitably contains errors, among which are receiver and transmitter clock errors, as well as delays caused by the non-zero refractivity of the atmosphere, instrumental delays, multipath effects, and detector noise. Any carrier phase observation additionally contains an unknown integer number of signal cycles, that is, an integer number of carrier wavelengths, that have elapsed before a lock-in to this signal alignment has been obtained. This number is referred to as the "carrier phase ambiguity". Usually, the observables are measured, i.e., sampled by a receiver at discrete consecutive times. The index for the time at which an observable is measured is referred to as "epoch". The known position determination methods commonly involve a dynamic numerical value estimation and correction scheme for the distances and error components, based on measurements for the observables sampled at consecutive epochs.

When GNSS signals are continuously tracked and no loss-of-lock occurs, the integer ambiguities resolved at the beginning of a tracking phase can be kept for the entire GNSS positioning span. The GNSS satellite signals, however, may be occasionally shaded (e.g., due to buildings in "urban canyon" environments), or momentarily blocked (e.g., when the receiver passes under a bridge or through a tunnel). In such cases, the integer ambiguity values are lost and must be re-determined. This process can take from a few seconds to several minutes. In fact, the presence of significant multipath errors or unmodeled systematic biases in one or more measurements of either pseudo-range or carrier phase may make it difficult with present commercial positioning systems to resolve the ambiguities. As the receiver separation (i.e., the distance between a reference receiver and a mobile receiver whose position is being determined) increases, distance-dependent biases (e.g., orbit errors and ionospheric and tropospheric effects) grow. Therefore, reliable ambiguity resolution (or re-initialization) becomes an even greater challenge.

The accuracy of the ambiguity resolution and attenuation of the various errors depend entirely on the quality of the GNSS signals, and sometimes also on how accurate a related "relaxed" estimation problem can be solved. As such, including more GNSS satellite signals in an estimation problem can improve both the overall quality of the measurements and the accuracy of the associated "relaxed" estimation problem, implicitly improving ambiguity resolution and error attenuation. In general, performance issues in GNSS positioning can be addressed by improving the physical hardware of the receivers and launching more GNSS constellations from which signals can be received, by relying on corrections provided by GNSS enhancement services, or by leveraging measurement data from multiple receivers provided that the resulting estimates are not statistically independent.

GNSS enhancement refers to techniques used to improve the accuracy of positioning information provided by the Global Positioning System or other global navigation satellite systems in general, a network of satellites used for navigation. For example, some methods use different techniques based on different satellites, differencing between receivers, differencing between epochs, and combinations thereof. Single and double differences between satellites and the receivers reduce the error sources but do not eliminate them.

As such, there is a need to increase the accuracy of GNSS positioning. To address this problem, several methods use the cooperation of multiple GNSS receivers in addition to classical GNSS enhancement services to improve estimation accuracy. However, to properly cooperate, the multiple GNSS receivers need to be synchronized and their operation needs to be constrained. For example, U.S. Pat. No. 9,476,990 describes cooperative GNSS positioning estimation by multiple mechanically connected modules. However, such a restriction on the cooperative enhancement of accuracy of GNSS positioning is not always practical.

Accordingly, there is a need to consider cooperative positioning using multiple moving devices enabled with GNSS receivers. However, such a cooperative positioning scheme is computationally challenging to implement.

SUMMARY

It is an object of some embodiments to increase the accuracy of GNSS positioning. Additionally or alternatively, it is an object of some embodiments to increase the accuracy of GNSS positioning by jointly tracking states of a plurality of devices moving in a region. Specifically, some embodiments are based on a recognition that cooperative tracking of the states of multiple devices moving in the region using the GNSS measurements collected by each of the devices can improve the accuracy of estimation of each of the devices because GNSS measurements received by one device can complement GNSS measurements of another device.

When considering cooperative positioning using multiple devices enabled with GNSS receivers, the number of states that are to be estimated increases with the number of receivers that are included. For large enough estimation problems, it may no longer be feasible to jointly estimate the states of all the considered receivers, necessitating methods of partitioning the receivers into smaller groups or clusters to gain the improvements in cooperative positioning while resulting in computationally tractable estimation problems, such that the GNSS enhancement service can be run in real-time.

For GNSS positioning problems with multiple receivers, especially in cases where the receivers' state spaces partially overlap and/or the inter-receiver measurement noise is correlated, accurate modeling can be leveraged to formulate large, centralized estimation problems. Such estimation problems can be solved using probabilistic filters to yield improvements over estimation problems formulated in the local information of the receiver and solved in the same manner, as additional measurement information can be leveraged along with modeling of inter-GNSS receiver relationships in computing the estimates. However, as the number of GNSS receivers participating in the cooperative positioning increases, the central estimation problem becomes more difficult to solve, rendering such approaches infeasible when considering large numbers of GNSS receivers.

In general, the GNSS receivers require the estimates in real-time, and it is, therefore, computationally beneficial to group the GNSS receivers into smaller clusters in which cooperative estimation can be done more efficiently. These partitions effectively impose structure on the global state estimate distribution that would be entertained in a completely centralized filter, rendering the problem computationally tractable at the cost of decreasing estimation performance. This raises the question of how to best perform the clustering and combine various GNSS receivers such that the information provided by one GNSS receiver to the cluster maximally benefits the remaining GNSS receivers estimates while retaining computational feasibility in the cluster.

For example, while the embodiments are applicable to a variety of mobile devices, such an estimation can be performed by a distributed estimation system (DES). For example, if the moving device is a vehicle, the vehicle can pass near a roadside unit (RSU) implementing the DES configured to estimate the states of all vehicles in the controlled region using various estimation techniques taking advantage of overlapping information. Hence, when the states of multiple vehicles are determined cooperatively, the states of the vehicle may or may not overlap, and the ambiguities or delays may or may not overlap, but the measurement noise of different vehicles has a correlation that can be explored by cooperative state estimation. For example, errors in the measurements of different pairs of vehicles can be related to each other and, thus, the state estimation errors can be reduced.

Some embodiments are based on understanding that when all the vehicles in the controlled region participate in the joint estimation, the best possible improvements of the state estimation can be achieved. Unfortunately, considering all these vehicles in the joint tracking may not be computationally feasible. This is because the GNSS positioning problem concerns the estimation of a receiver's states from a set of code and carrier-phase measurements received from one or several constellations of satellites. The measurement equations are time-varying, nonlinear in the position of the receiver, and incorporate various biases and integer ambiguities. In the carrier-phase measurements, there is an integer bias known as the integer ambiguity, unique to each carrier-phase measurement from each satellite.

When considering these biases in time, they follow an integer jump process, remaining constant before sporadically and independently of each other jumping to new integer values, commonly referred to as "cycle slip". Hence, the GNSS positioning problem can be seen as a mixed-integer GNSS positioning problem solving a mixed-integer problem of ever-increasing size (with new integer biases included in each time-step), and careful considerations need to be made in how to best relax this estimation problem to make the resulting joint state tracking implementable.

Some embodiments are based on a recognition that the computational advantage can be achieved by grouping and/or clustering the vehicles in the controlled region in different, e.g., disjoint, clusters and performing joint tracking for each cluster independently from the tracking in another cluster. When the clustering is performed subject to constraints on the size of each cluster, multiple probabilistic filters can be concurrently executed with the complexity of each execution limited by the size of the cluster. For example, the size of each cluster can be determined by the computational power of the DES, the number of GNSS measurements, and/or the number of state variables to be tracked.

For example, one embodiment discloses a method referred to as a clustering algorithm, which partitions the centralized cooperative estimation problem into multiple smaller estimation problems in which the GNSS receivers are permitted to share information through a designated cluster, yielding the benefits of centralized cooperative positioning while retaining computational feasibility when the number of participating GNSS receivers is large.

In one embodiment, this clustering is done by directly optimizing a cost expressed in available measures of estimation performance using an iterative optimization heuristic that entertains multiple clusters and evaluates them in a simulation-based manner, improving the clustering in time with respect to the cost and leveraging any additional computational resources of a processor to improve the clustering. This algorithm acts as a central coordinator of the clusters, but can be run at much slower rates, and will only change the clustering if it finds a way to improve it with respect to the cost expressed in the estimation performance.

In one embodiment, the cost is expressed in the mean square error (MSE) of the estimate, which is the measure of performance that the widely used probabilistic filters based on the Kalman filtering (KF) paradigm aspires to minimize. However, instead of weighing the MSE equally across all the states in the centralized estimation problem, the cost is skewed to explicitly minimize the MSE of the positional states of the GNSS receivers, as this is typically the form in which specifications are set in GNSS positioning problems. Furthermore, the flexible definition of the cost allows the direct minimization of the MSE performance of the worst performing cluster, as well as the worst performing GNSS receiver among all the clusters.

In one embodiment, the cluster optimization is done by a genetic algorithm (GA) which entertains a population of solutions, that is, feasible clusters given defined constraints on computational bandwidth. The GA attempts to find an improved clustering in the space of clusters accessible through a set of arithmetic mutations applied to the clusters in the population, and iteratively improves the way in which the GNSS receivers are clustered. It is understood that this clustering is implemented in software and can be seen as a method to factor and impose structure in the global estimate distribution to maximize the benefit of an GNSS receiver participating in the cooperative positioning scheme, while permitting the larger estimation problem to be solved in many smaller problems, enabling the processing done in each cluster to retain computational feasibility.

In one embodiment, the set of clusters is represented as an integer array, where the number of unique elements determines the number of clusters used, and by which the GNSS receivers can be assigned to specific clusters. In the GA, this permits efficient storage of multiple such solutions, and the definition of simple probabilistic operations by which the solutions can be perturbed into new feasible solutions. These operations are used to define new ways in which to cluster the GNSS receivers, which potentially improve upon previous clustering with respect to the defined cost.

Once partitioned, the clusters can operate on separate processors that communicate with their designated GNSS receivers through RF communication. However, one embodiment executes all or some of the clusters along with the iterative cluster optimizer on the same server, and effectively provides a flexible GNSS enhancement service where GNSS receivers can participate and upload their internal information to receive improved estimates as computed by the clusters on the servers. This is made possible by the partitioning computed by the clustering algorithm, as the partition can be made in software and the computations done in each cluster can be run in parallel, better utilizing the available cores of the processor. Furthermore, when the number of clusters is large, adding up the computations required in the clusters results in far less computations than that which would be required in executing a completely centralized filter.

In such a manner, the various embodiments applicable to cooperative positioning as a DES with multiple GNSS receivers where the number of participating GNSS receivers is large, in which case the proposed method adapts the way in which GNSS receivers are permitted to share measurement information to yield computationally tractable estimation problems. This retains the benefit of cooperative positioning, makes such methods applicable to scenarios where the number of participating GNSS receivers is large, and can directly optimize the average and worst-case performance of the GNSS receivers in a defined measure of estimation performance.

Accordingly, one embodiment discloses a distributed estimation system (DES) for jointly estimating states of a plurality of GNSS receivers moving in a region using measurements of a Global Navigation Satellite System (GNSS), wherein each of the moving GNSS receivers is equipped with a GNSS transceiver configured to receive GNSS measurements and transmit GNSS data including one or a combination of the GNSS measurements and derivative of the GNSS measurements, the DES comprising: at least one processor; and the memory having instructions stored thereon that, when executed by the at least one processor, cause the DES to: collect the GNSS data transmitted by the plurality of GNSS receivers over a wireless communication channel; cluster the plurality of GNSS receivers into a set of different clusters subject to a constraint indicative of an upper bound on several GNSS receivers in each cluster defining computational complexity of jointly estimating the states of the GNSS receivers assigned to each cluster; execute a set of probabilistic filters corresponding to the set of clusters to estimate the states of GNSS receivers in one cluster independently from estimating states of the GNSS receivers in other clusters, wherein a probabilistic filter estimates the states of the GNSS receivers in a corresponding cluster by fusing the GNSS data collected from the GNSS receivers in the cluster to jointly reduce an estimation error of each of the GNSS receivers in the cluster; update the clusters of the plurality of GNSS receivers based on a measure of estimation error in the states of different GNSS receivers in different clusters subject to a computational constraint; and transmit the tracked states to the corresponding GNSS receivers.

Another embodiment discloses a method for jointly estimating states of a plurality of GNSS receivers moving in a region using measurements of a Global Navigation Satellite System (GNSS), wherein each of the moving GNSS receivers is equipped with a GNSS transceiver configured to receive GNSS measurements and transmit GNSS data including one or a combination of the GNSS measurements and derivative of the GNSS measurements, wherein the method uses a processor coupled with stored instructions implementing the method, wherein the instructions, when executed by the processor carry out steps of the method, comprising: collecting the GNSS data transmitted by the plurality of GNSS receivers over a wireless communication channel; clustering the plurality of GNSS receivers into a set of different clusters subject to a constraint indicative of an upper bound on several GNSS receivers in each cluster defining computational complexity of jointly estimating the states of the GNSS receivers assigned to each cluster; executing a set of probabilistic filters corresponding to the set of clusters to estimate the states of GNSS receivers in one cluster independently from estimating states of the GNSS receivers in other clusters, wherein a probabilistic filter estimates the states of the GNSS receivers in a corresponding cluster by fusing the GNSS data collected from the GNSS receivers in the cluster to jointly reduce an estimation error of each of the GNSS receivers in the cluster; updating the clusters of the plurality of GNSS receivers based on a measure of estimation error in the states of different GNSS receivers in different clusters subject to a computational constraint; and transmitting the tracked states to the corresponding GNSS receivers.

Yet another embodiment discloses a non-transitory computer-readable storage medium embodied thereon a program executable by a processor for performing a method for jointly estimating states of a plurality of GNSS receivers moving in a region using measurements of a Global Navigation Satellite System (GNSS), wherein each of the moving GNSS receivers is equipped with a GNSS transceiver configured to receive GNSS measurements and transmit GNSS data including one or a combination of the GNSS measurements and derivative of the GNSS measurements, the method comprising: collecting the GNSS data transmitted by the plurality of GNSS receivers over a wireless communication channel; clustering the plurality of GNSS receivers into a set of different clusters subject to a constraint indicative of an upper bound on several GNSS receivers in each cluster defining computational complexity of jointly estimating the states of the GNSS receivers assigned to each cluster; executing a set of probabilistic filters corresponding to the set of clusters to estimate the states of GNSS receivers in one cluster independently from estimating states of the GNSS receivers in other clusters, wherein a probabilistic filter estimates the states of the GNSS receivers in a corresponding cluster by fusing the GNSS data collected from the GNSS receivers in the cluster to jointly reduce an estimation error of each of the GNSS receivers in the cluster; updating the clusters of the plurality of GNSS receivers based on a measure of estimation error in the states of different GNSS receivers in different clusters subject to a computational constraint; and transmitting the tracked states to the corresponding GNSS receivers.

DETAILED DESCRIPTION

In some embodiments, a server jointly tracks the states of multiple GNSS receivers using measurements of satellite signals received at each GNSS receiver and parameters of the probabilistic distribution of the state of each GNSS receiver. When considering many GNSS receivers, the server computes how to best group the GNSS receivers into smaller clusters, such that the measurement information in each cluster maximally benefits the participating GNSS receivers while rendering the estimator executed in each cluster computationally feasible. This clustering is done iteratively and permits the clusters to fuse states and measurements into an augmented state of the multiple GNSS receivers. The server executes a set of probabilistic filters updating the augmented state and fuses the state of at least some of the multiple GNSS receivers with a corresponding portion of the updated augmented state. This results in a scalable GNSS enhancement service where participating GNSS receivers can improve their estimates by incorporating the information contained in their designated cluster.

Figure 1A:
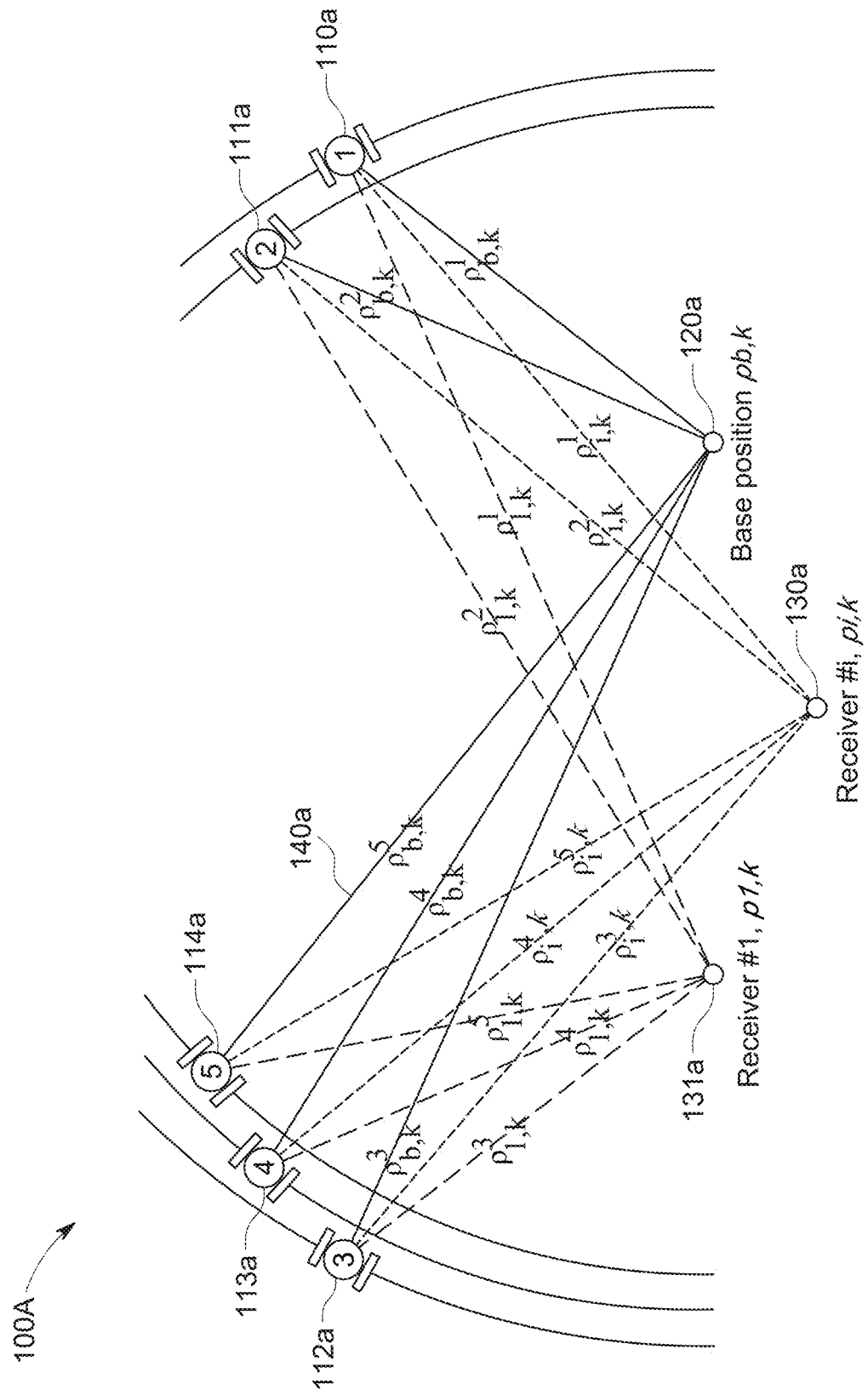
FIG. 1A shows a schematic of a global navigation satellite system (GNSS) according to some embodiments.

FIG. 1A illustrates the geometry of a Global Satellite Navigation System (GNSS) according to some embodiments. The receivers 130a and 131a receive radio signals which are processed in the GNSS receiver to yield "pseudo-range" and "carrier-phase" measurements. These signals relate to the geometric range in 140a by a set of biases and are in some embodiments combined with measurement to a known base station in 120a to attenuate sources of error. One such set of "pseudo-range" and "carrier-phase" measurements are received per satellite seen by the receiver on each epoch and processed locally in the receiver. In this FIG. 1A, the set of visible satellites is illustrated 110a-114a, but some embodiments utilize a much larger number of satellites from many different constellations and multiple carrier-frequency bands per satellite.

In various embodiments, the GNSS receivers 120a, 130a, and 131a may differ. For example, in the embodiment depicted in FIG. 1A, receiver 120a is a base receiver, whose position is known and can be mounted on the ground. In contrast, receivers 130a and 131a can be either mobile and assumed to be in motion or stationary receivers, but in either case, their positions are unknown. For instance, the receivers 130a and 131a can be mounted on a cell phone, a car, or a tablet. In all described embodiments, there are multiple GNSS receivers receiving code and carrier phase signals, and the number of receivers is large.

Figure 1B:
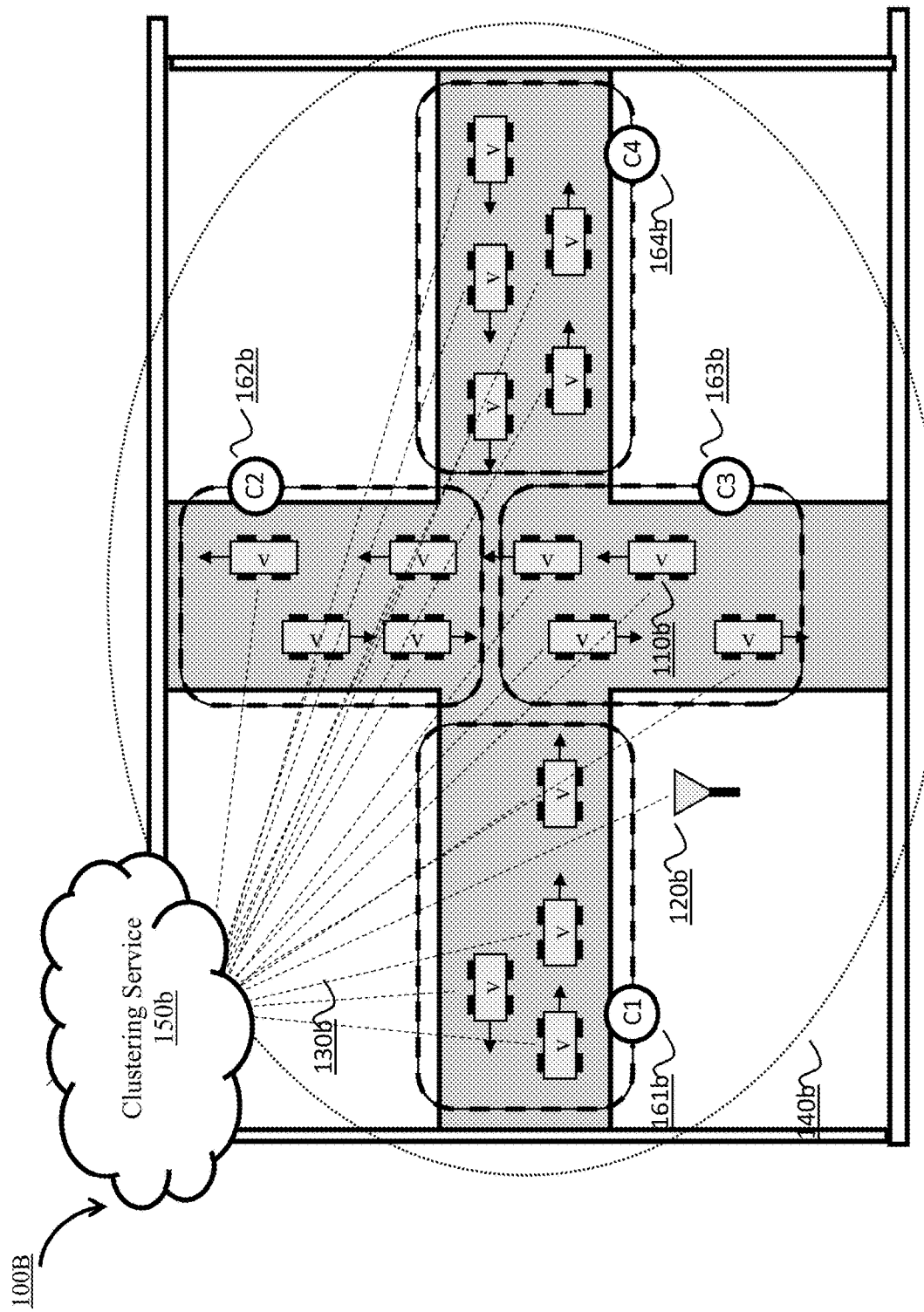
FIG. 1B shows an urban driving scenario relating cooperative positioning of individual GNSS receivers to a clustering algorithm.

FIG. 1B illustrates a scenario 100B with a controlled roadside unit (RSU) in which clustering is needed to facilitate real-time execution during cooperative positioning. In this example, several GNSS receivers are attached to vehicles 110b in a four-way crossing, and a remote communication unit (RCU) 120b is located nearby, such that the vehicles are moving within a region controlled by the RCU 120b. Ideally, a joint estimation problem would be posed and solved by combining all the measurement information from all the vehicles 140b in the clustering service 150b, potentially running on a cloud server. However, this may be too computationally heavy to facilitate real-time execution if there are many vehicles. Consequently, several smaller estimation problems are formed in the clustering service 150*b*, combining the vehicles into smaller groups or "clusters" in 161*b*, 162*b*, 163*b*, and 164*b*. The act of forming smaller estimation problems in this manner is referred to as "clustering".

Figure 1C:
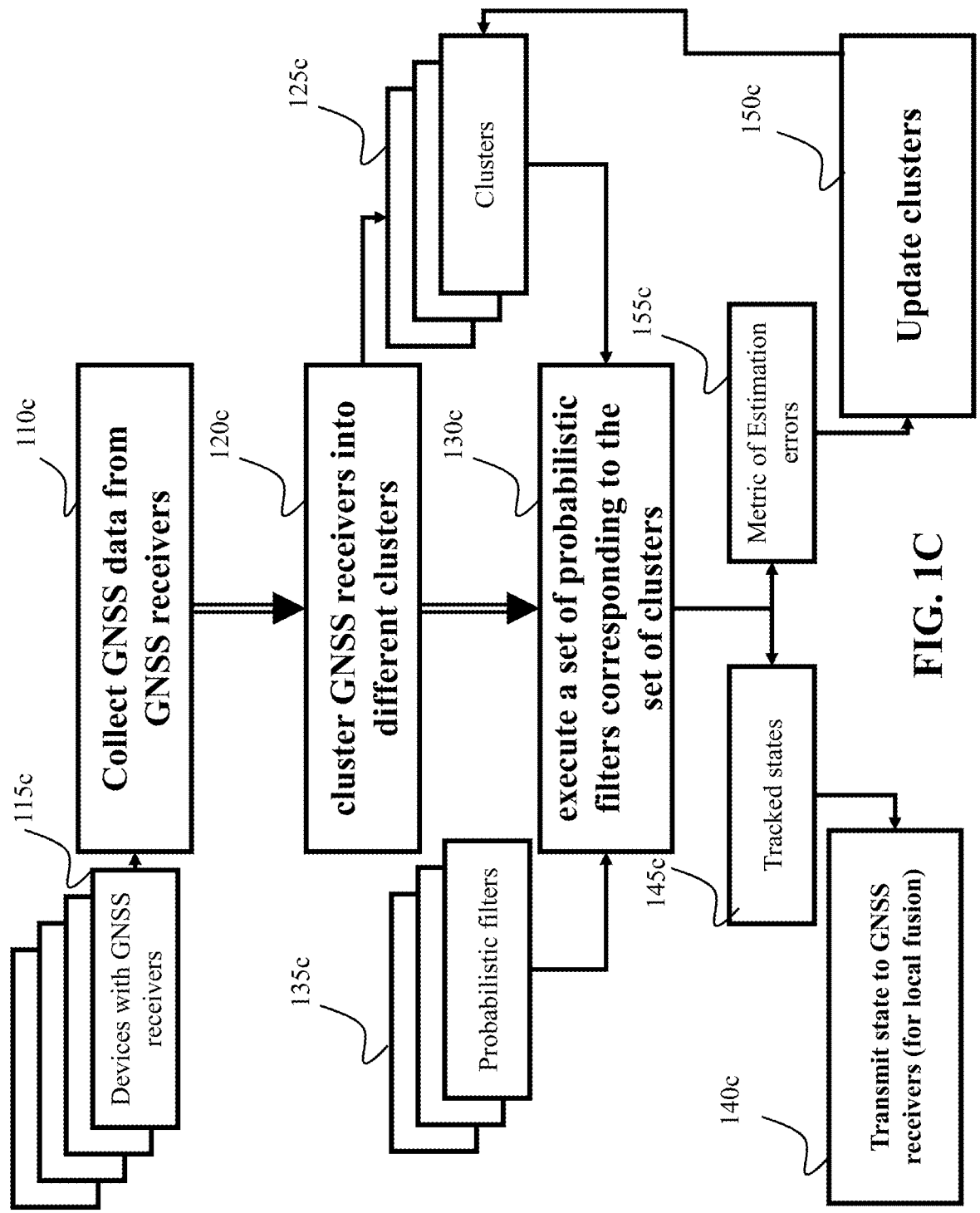
FIG. 1C shows a block diagram of a distributed estimation system (DES) according to some embodiments.

FIG. 1C shows a block diagram of a distributed estimation system (DES) according to some embodiments for jointly tracking states of a plurality of devices moving in a region controlled by the DES using measurements of a Global Navigation Satellite System (GNSS). Each of the moving devices is equipped with a GNSS transceiver configured to receive GNSS measurements and transmit GNSS data including one or a combination of the GNSS measurements and derivative of the GNSS measurements. Hence, these devices are also referred to herein as GNSS receivers 115*c*.

The DES includes at least one processor and a memory having instructions stored thereon that, when executed by the at least one processor, carry out steps of a joint tracking method executed by the DES. In addition, the DES is connected to the plurality of the devices 115*c* via a wireless communication channel. For example, when the moving devices are vehicles, the communication channel can be implemented using a vehicle-to-vehicle and/or a vehicle-to-base station communication protocol.

The DES is configured to collect 110*c* the GNSS data transmitted by the plurality of devices 115*c* over a wireless communication channel and cluster 120*c* the plurality of devices into a set of different clusters 125*c* subject to a constraint indicative of an upper bound on the number of devices in each cluster, thus bounding the computational complexity of joint state tracking in each cluster. The constraints on the number of devices aim to limit the computational complexity of the tracking problem while preserving the benefits of joint tracking.

Clustering allows the DES to execute 130*c* a set of probabilistic filters 135*c* corresponding to the set of clusters to track the states of devices in one cluster independently from tracking states of the devices in other clusters. For example, if the devices are grouped into five clusters, five probabilistic filters are executed concurrently to track the state of the devices in their corresponding classes. In such a manner, each probabilistic filter can take advantage of the correlation of GNSS data of multiple devices but may not be overburdened with a prohibitively large computational problem.

In various embodiments, a probabilistic filter tracks the states 145*c* of the devices in a corresponding cluster by fusing the GNSS data collected from the devices in the cluster to jointly reduce a metric of estimation error 155*c* in tracking the state of each of the devices in the cluster. Some embodiments are based on a recognition that when all the vehicles in the controlled region participate in the joint estimation, the best possible improvements of the state estimation can be achieved. Unfortunately, considering all these vehicles in the joint tracking may not be computationally feasible. Hence, while the computational advantage can be achieved by grouping and/or clustering the devices in the controlled region in different, e.g., disjoint, clusters and performing joint tracking for each cluster independently from the tracking in another cluster, the clustering can lead to some estimation errors 155*c*. In turn, these estimation errors can be used to update the clusters 150*c* with an aim to reduce these errors. Accordingly, in some embodiments, the DES is configured to update 150*c* the clusters of the plurality of devices based on the estimation errors of the states of different devices in different clusters subject to the constraint and transmit 140*c* the tracked states 145*c* to the corresponding devices. In some implementations, the devices 115*c* use the local fusion to fuse the state estimation performed by the DES with their local estimates, as described below. The GNSS positioning problem concerns the estimation of a receiver's states from a set of code and carrier-phase measurements received from one or several constellations of satellites. The measurement equations are time-varying, nonlinear in the position of the receiver, and incorporate various biases and integer ambiguities. In the carrier-phase measurements, there is an integer bias known as integer ambiguity, unique to each carrier-phase measurement from each satellite. When considering these biases in time, they follow an integer jump process, remaining constant before sporadically and independently of each other jumping to new integer values, commonly referred to as "cycle slip". Hence, the GNSS positioning problem can be seen as a mixed-integer GNSS positioning problem solving a mixed-integer problem of ever-increasing size (with new integer biases included in each time-step), and careful considerations need to be made in how to best relax this estimation problem to make the resulting joint state tracking implementable.

Some embodiments are based on a recognition that the computational advantage can be achieved by grouping and/or clustering the vehicles in the controlled region in different, e.g., disjoint, clusters and performing joint tracking for each cluster independently from the tracking in another cluster. When the clustering is performed subject to constraints on the size of each cluster, multiple probabilistic filters can be concurrently executed with the complexity of each execution limited by the size of the cluster. For example, the size of each cluster can be determined by the computational power of the DES, the number of GNSS measurements, and/or the number of state variables to be tracked.

Some embodiments are based on understanding that different techniques can be used to cluster the devices, such as the vehicles moving in the controlled region. However, while clustering reduces the computational complexity, it also reduces the accuracy of estimation when compared with the joint estimation of all vehicles. To that end, it is an object of some embodiments to perform the clustering in a manner that reduced the degradation of performance.

For example, clustering can be performed randomly or equally. However, such clustering can unjustifiably decrease performance. The clustering can be done more intelligently based on the mutual information shared by the tracked devices. Indeed, in deciding how to cluster the tracked devices into smaller subsets, the mutual benefit of devices sharing measurement information is to be maximized subject to constraints on the number of measurements and states contained in the resulting estimation problems. However, this is not necessarily the same as maximizing the mutual information between receivers over the possible ways of clustering them, as it may be beneficial to separate two poorly performing devices that share mutual information and put these into clusters with better-performing devices. Furthermore, computing the mutual information of the devices implies evaluating the joint distribution of states of the different devices which becomes problematic when the estimation problem is large and involves many devices.

Figure 1D:
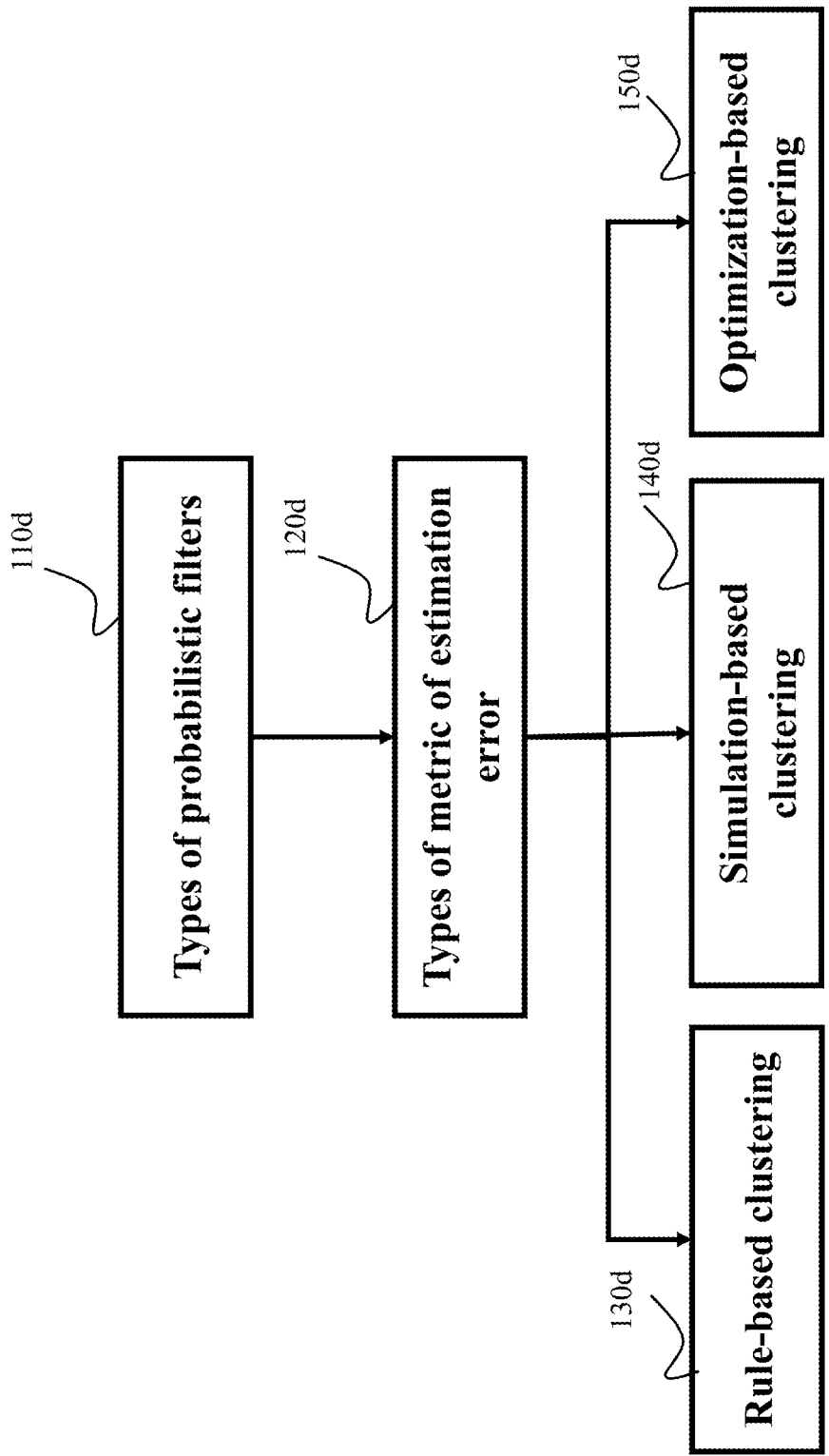
FIG. 1D shows a schematic of different clustering techniques employed by some embodiments.

FIG. 1D shows a schematic of different clustering techniques employed by some embodiments. Some embodiments are based on the realization that if the objective of the joint state tracking is to reduce an estimation error of tracking the state of each of the devices, and the clustering can negatively affect this objective, the state estimation error can itself serve as a guidance of the clustering. This realization allows some embodiments to compare estimation errors of different devices and perform the clustering based on this comparison. In such a manner, the improving of the accuracy of state estimation works on two levels serving the same objective, i.e., the fusing of the GNSS data of each cluster and the cluster assignments.

Different techniques can be used to update the clusters based on the state estimation errors. For example, various embodiments use rule-based $130d$, simulation-based $140d$, and optimization-based $150d$ techniques.

For example, one embodiment using the rule-based technique $130d$ is configured to update the clusters by reassigning a GNSS receiver with the largest estimation error to a different cluster. Additionally or alternatively, another embodiment is configured to exchange cluster assignments of a GNSS receiver with the largest estimation error in one cluster with a GNSS receiver with the smallest estimation error in a different cluster.

For example, one embodiment using the simulation-based technique $140d$ is configured to update the clusters by performing a simulation of different assignments of the plurality of GNSS receivers $115c$ to different clusters and a simulation of estimating the state of the GNSS receivers for different simulated assignments to receive collections of simulated estimation errors for different clusters. The simulation allows comparing the simulated estimation errors with the estimation error of estimating the state of each of the GNSS receivers to produce a result of comparison and update the clusters of the plurality of GNSS receivers based on the result of the comparison.

Additionally or alternatively, one embodiment uses the optimization-based technique $150d$ aiming to minimize a fitness function. The fitness function adds flexibility in defining the objective of the clustering problem. For example, one embodiment defines the clustering problem as one or a combination of the metric of estimation error at the level of the GNSS receiver, the level of the cluster, the combination of all the clusters, or any combination thereof. In one implementation of this embodiment, to update the clusters, the DES is configured to evaluate a fitness function defining a cost of the clustering based on one or a combination of an average MSE across the plurality of GNSS receivers, an average MSE of the GNSS receivers in a worst-performing cluster, and the MSE of a worst-performing GNSS receiver.

Additionally or alternatively, the fitness function can be determined to define the clustering as based on mutual information between measurements and the states in a prospective cluster; formed in a measure of estimate error entropy; or formed in measures that do not relate to the statistical properties of the estimates in the cluster, but rather measures such as signal quality in the measurement information, the relative proximity of the GNSS receivers, the receiver types used in the GNSS receivers, or the overlap in the number of satellites seen by the GNSS receivers.

One advantage of using the fitness function is that the function can be evaluated using historical data using simulation and other iterative and/or optimization techniques. For example, in some embodiments, the fitness function is evaluated by computing empirical statistics of the estimation errors over a time interval.

Another advantage of the fitness function is that it can be minimized using an iterative optimization over the set of clusters. This iterative optimization allows different embodiments to use various permutation techniques to optimize the fitness function.

For example, some embodiments pose iterative reassignments in the clustering problem in terms of genetic mutation governed by a genetic algorithm. In computer science and operations research, a genetic algorithm (GA) is a metaheuristic inspired by the process of natural selection that belongs to the larger class of evolutionary algorithms (EA). Hence, iterative clustering can be considered as the natural selection applied to a population of candidate clustering solutions, which compete with one another in a measure defined by the fitness function.

In a genetic algorithm, a population of candidate solutions to an optimization problem is evolved toward better solutions. Each candidate solution has a set of properties that can be mutated and altered. The solutions can be represented in binary as strings of 0s and 1s, but other encodings are also possible, such as the integer array in which each integer represents to which cluster the GNSS receiver at the corresponding element of the array belongs. Some embodiments adapt the principles of the genetic algorithm to the clustering by permitting the mutations to operate directly on such integer arrays. This is advantageous because the candidate solutions can be efficiently represented in memory, and the constraints related to computational complexity can be enforced by simply checking the number of occurrences of an integer in the array. To that end, in some embodiments, the fitness function is minimized using a genetic algorithm (GA), and the fitness is evaluated only in the clusters that were affected by a given mutation, as described in more detail below.

Notably, in some embodiments, probabilistic filters $110d$ are designed to reduce specific measures of state estimation errors. Hence, the clustering based on such measures takes advantage of the principles of filter implementations. To that end, different embodiments use several types of estimation errors $120d$ aligned with the principles of operation of the probabilistic filters $110d$. Examples of the estimation errors include, but are not limited to, measures of the moments of the probability distribution of estimation error, such as a mean square error in the Gaussian setting, and estimation error entropy.

For example, in some embodiments, the probabilistic filters are realized as nonlinear Gaussian approximate density filters herein referred to as a Kalman filter (KF). The KF uses a series of measurements observed over time, including statistical noise and other inaccuracies, and produces estimates of unknown states by computing a joint probability distribution over the states and measurements for time step and subsequently conditioning the predicted joint distribution on the sampled measurements. Kalman filtering is optimal with respect to minimizing MSE in the estimate posterior when the estimation model is linear in the states and the noise is Gaussian. To that end, in some embodiments, the measure of estimation error employed in the clustering is based on an MSE computed in the posterior of a corresponding state estimate.

Other examples of measures of estimation errors used by different embodiments include a weighted MSE, wherein not all the states of the receiver are made equally important. For instance, the weighting can be designed to only consider the performance of the positional states of the receiver by computing the MSE in the relevant part of the state estimate posterior. In doing so, measures of estimation error can be formed in the positional MSE of the worst-performing receiver (GNSS receiver-level), the average positional MSE of the worst-performing cluster (cluster-level), or a global positional MSE, averaging the performance in all GNSS receivers in all clusters (all clusters).

Figure 2A:
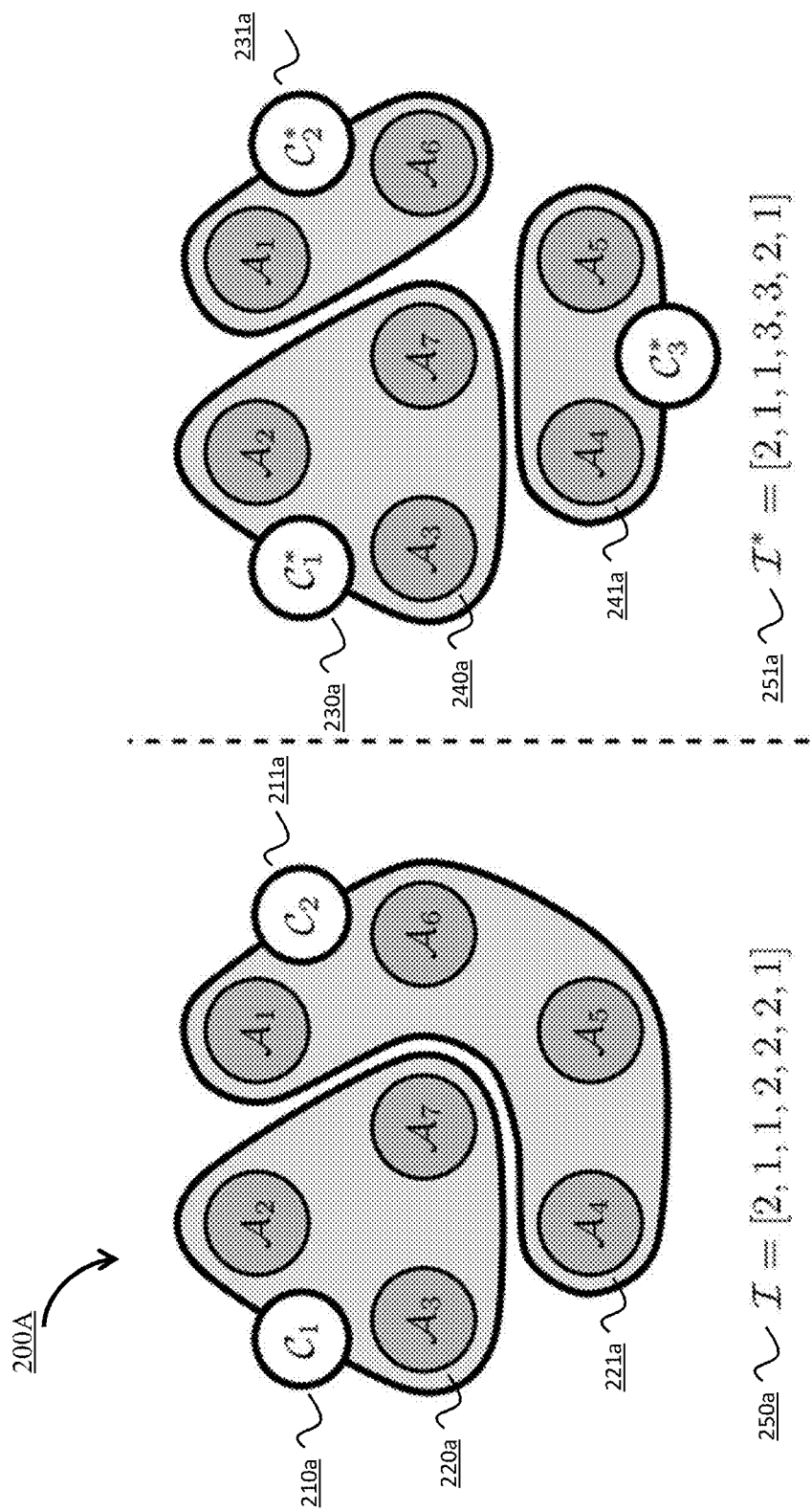
FIG. 2A shows a representation of clusters of receivers as integer valued arrays, demonstrating how a same set of receivers can be partitioned into two different clusters.

FIG. 2A shows a representation 200A of clusters of receivers as integer valued arrays, demonstrating how the same set of receivers can be partitioned into two different clusters. In FIG. 2A, a notion of clustering is introduced in an abstract graph. The GNSS receivers are denoted $A_i$, and the objective is to group these GNSS receivers into clusters, denoted $C_j$, where the GNSS receivers in each cluster are permitted to share and utilize each other's measurement information. In one embodiment, this is done by radio frequency (RF) communication through a server in which the part of the cooperative positioning algorithm is running. FIG. 2A shows two ways in which the same set of GNSS receivers can be clustered. To the left, the GNSS receivers 220a $\{A_2, A_3, A_7\}$ are grouped into a cluster $C_1$ in 210a while the GNSS receivers 221a $\{A_1, A_4, A_5, A_6\}$ are grouped into the cluster $C_2$ in 211a. To the right, the cluster $C^*$ in 230a is kept the same as cluster $C_1$ in 210a, while the second cluster is divided into two smaller clusters $C_2^*$ in 231a and $C_3^*$ in 232a. Here, the estimation performance in the clustering to the right is likely to be worse, but it will be less computationally burdensome, as the resulting estimation problems are smaller. These clusters correspond to those depicted in FIG. 1B as 161b, 162b, 163b, and 164b, and in which the GNSS receivers 110b are taken to be GNSS receivers mounted to vehicles.

In FIG. 2A, the cluster to which each GNSS receiver is assigned is in some embodiments represented by a vector of integers in 250a and 251a, here denoted by I, which is the decision or optimization variable in the clustering algorithm that assigns the set of GNSS receivers $\{A_i\}_{i=1}^{N}$ to the set of clusters $\{C_j\}_{j=1}^{M}$.

One objective of this partitioning is to facilitate a scalable cooperative positioning method, where the computational complexity associated with the processing done in each cluster is sufficiently low to facilitate real-time operation of the clustering service, while still retaining the benefits of cooperative positioning. The maximum computational complexity of a given filter can be expressed as a function of the number of states estimated and the number of measurements incorporated at any given point in time and bounding this quantity in each cluster will result in a constraint on the number of GNSS receivers that may be included in each cluster.

Figure 2B:
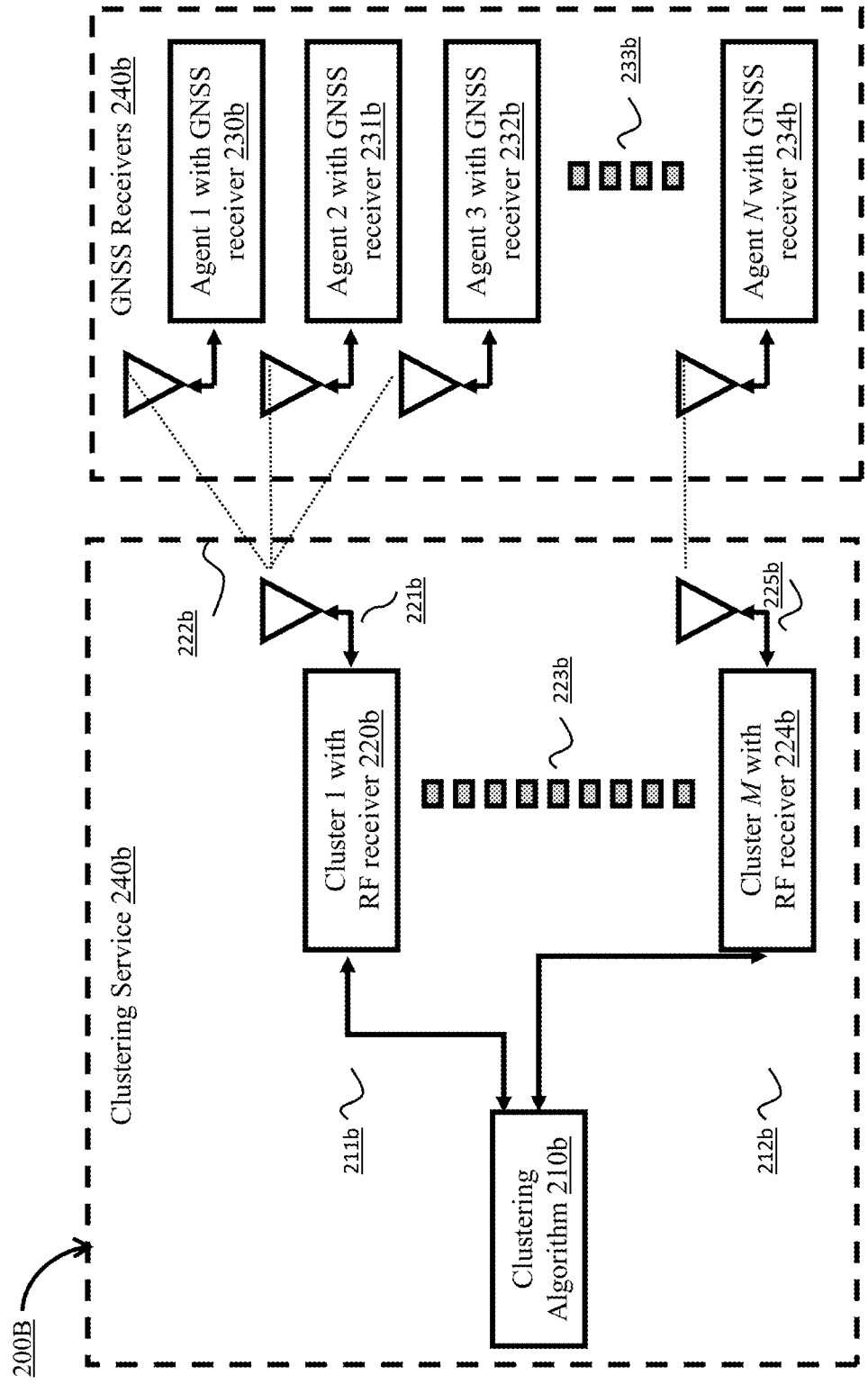
FIG. 2B shows a flowchart of a set of N GNSS receivers which communicate their measurement information to a set M of clusters, where in this embodiment, the GNSS receivers are assigned to clusters based on the clustering algorithm.

FIG. 2B shows a flowchart 200B of a set of N GNSS receivers which communicate their measurement information to a set M of clusters, where in this embodiment, the GNSS receivers are assigned to clusters based on a clustering algorithm. In FIG. 2B, the same system is abstracted into two blocks. In the first block (left), a clustering algorithm in 210b is run together the processing done in M clusters depicted in 220b, 224b, and 223b. Together, these form a clustering service in 240b, which in some embodiments is executed on a single server, and in others is distributed among multiple servers. In the second block (right), the various GNSS receivers in 230b-234b run their own internal probabilistic filters, updating their belief about their state vector using GNSS measurements and inter-GNSS receiver (cluster-level) corrections communicated to the GNSS receivers via RF communication in 222b. In some embodiments, the clusters are distributed among multiple computers each equipped with an antenna as in 221b and 225b, and in other embodiments, there is a single antenna connected to a larger server that performs the processing in the first block (left).

In FIG. 2B, each cluster communicates its current representation of the state estimate to the clustering algorithm in 211b and 212b. The clustering algorithm performs computations and determines to which cluster each GNSS receiver should belong. In some embodiments, the clusters return a Gaussian state distribution over the observable states given the measurement information in that cluster in 211b and 212b, and the clustering algorithm returns the integer vector I described in that indicates to which cluster a specific GNSS receiver should belong.

In some embodiments, each GNSS receiver in 230b-234b communicates its current estimate and measurement information to the cluster on each epoch to its designated cluster in 222b. In return, the cluster provides the GNSS receiver with an improved estimate or a virtual measurement update by which it can correct its local estimate and incorporate cluster-level information not otherwise known to the GNSS receiver, such as inter-GNSS receiver measurement noise correlations and measurement information from the remaining GNSS receivers in the cluster.

Figure 2C:
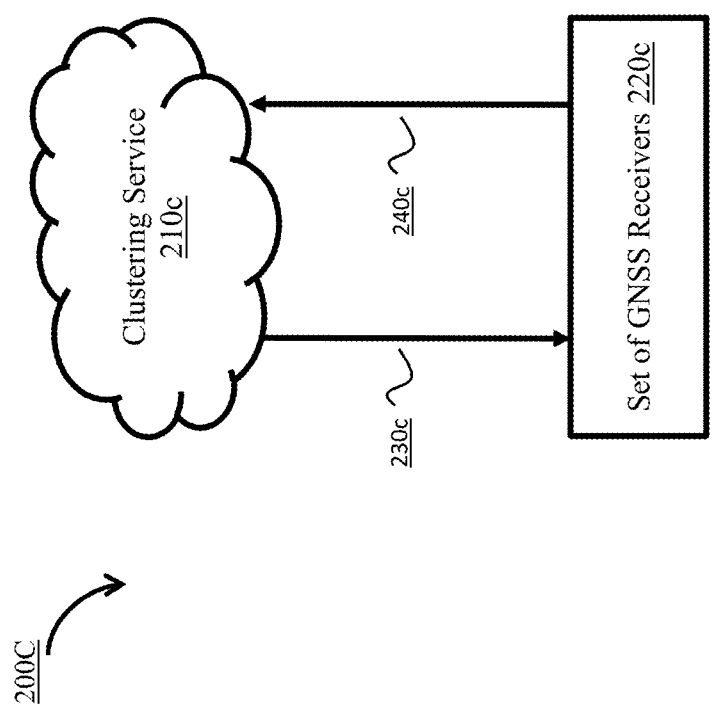
FIG. 2C shows a schematic of the clusters communicating their measurement information to the clusters, receiving improved estimates or virtual measurements in return.

FIG. 2C shows a schematic 200C of the clusters communicating their measurement information to the clusters, receiving improved estimates or virtual measurements in return. The cooperative positioning with clustering is a GNSS enhancement service as illustrated in FIG. 2C, where the participating GNSS receivers in 220c upload their estimate and measurement information by 240c to the server in 210c, which in some embodiments is a cloud server. The GNSS receivers receive virtual measurements in 230c that they may incorporate to improve their local estimate.

Figure 2D:
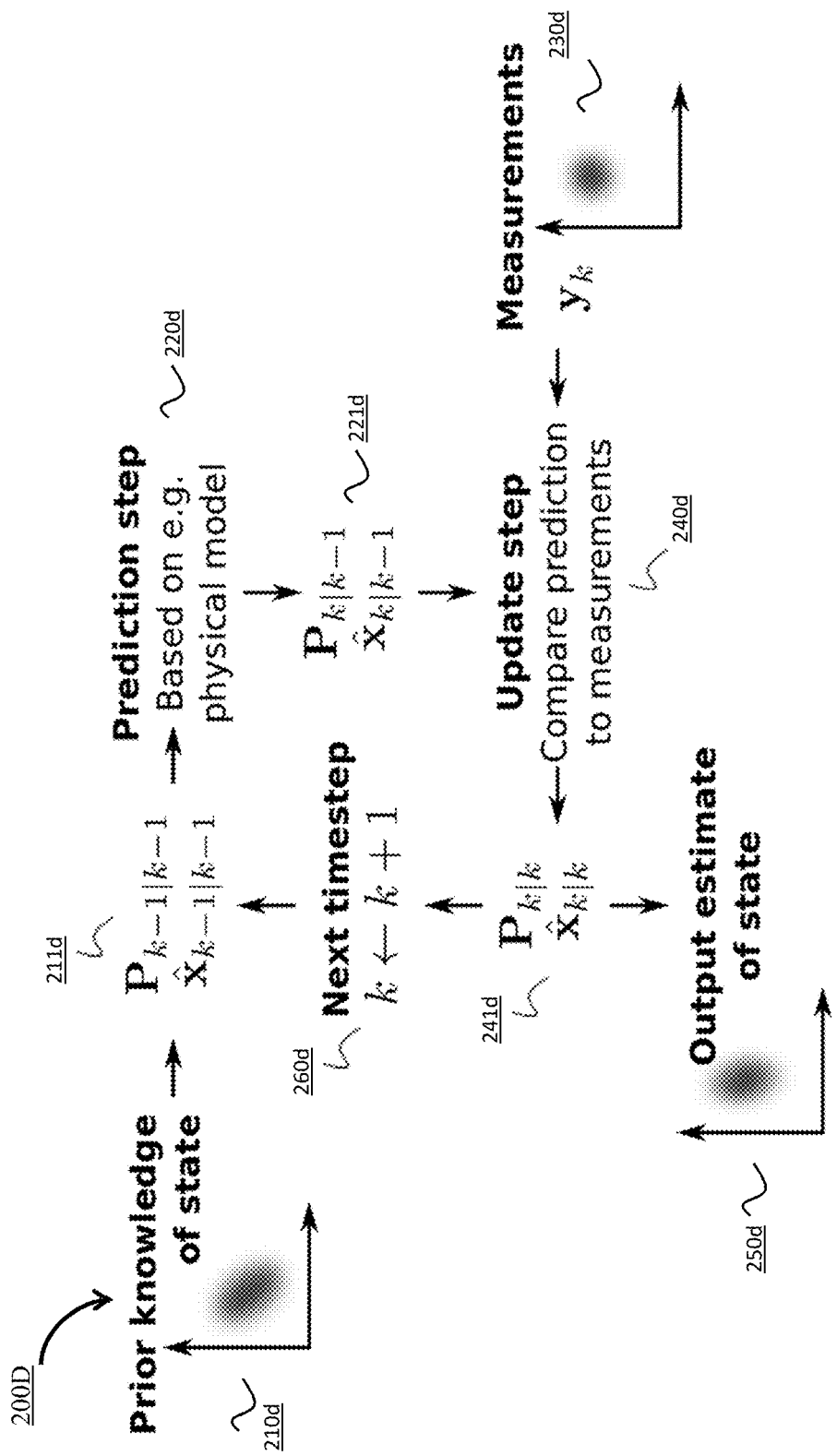
FIG. 2D shows a schematic of a Kalman filter (KF) used by some embodiments for state estimation of a moving GNSS receiver

FIG. 2D shows a schematic of the Kalman filter (KF) used by some embodiments for state estimation of a moving GNSS receiver. The KF is a tool for state estimation of moving GNSS receivers 200D that can be represented by linear state-space models, and it is the optimal estimator when the noise sources are known and Gaussian, in which case also the state estimate is Gaussian distributed. The KF estimates the mean and variance of the Gaussian distribution, because the mean and the variance are the two required quantities, sufficient statistics, to describe the Gaussian distribution.

The KF starts with an initial prior knowledge 210d in the mean of the state and its variance 211d. The KF then predicts 220d the state and the variance to the next time step, using a model of the system, such as the motion model of the vehicle 110b, to obtain a step ahead prediction of the mean and variance 221d of the state. The KF then uses a measurement 230d in an update step 240d using the measurement model of the system, wherein the model relates the sensing GNSS receiver's data 140a, to determine an updated mean and variance 241d of the state. An output 250d is then obtained, and the procedure is repeated for the next time step 260d.

Some embodiments employ a probabilistic filter including various variants of KFs, e.g., extended KFs (EKFs), linear-regression KFs (LRKFs), such as the unscented KF (UKF). Even though there are multiple variants of the KF, they conceptually function as exemplified by FIG. 2D. Notably, the KF updates the first and second moment, i.e., the mean and covariance, of the probabilistic distribution of interest, using a measurement 230d described by a probabilistic measurement model. In some embodiments, the probabilistic measurement model is a multi-head measurement model structured to satisfy the principles of measurement updates in the KF according to some embodiments.

Based on the posterior distribution in the KF, several statements can be made about the estimation error, if assuming that the estimate is unbiased and consistent. For instance, with an estimate $N(\bar{x}_k, P_k)$ in 250d, the mean square error (MSE) of the estimate error $x_k - \bar{x}_k$ can be computed as $E[\|x_k -$ $\bar{x}_k\|^2] = E[\text{Trace}((x_k - \bar{x}_k)(x_k - \bar{x}_k)^T)] = \text{Trace}(P_k)$, where $P_k$ is known in the estimate posterior 250*d* of the KF. Similarly, from the joint distribution of the predicted state 221*d* and measurement 230*d* we can compute conditional mutual information between the state and the measurements and conditional estimate error entropy. This will be approximate in the general nonlinear setting, and exact in the linear Gaussian setting.

If using different classes of probabilistic estimators, such as those rooted in the particle filtering paradigm, similar approximations methods can be leveraged to compute such measures of the estimation error, including, but not limited to, mean square errors, conditional mutual information of inputs (measurements) and outputs (states), and conditional estimation error entropy.

Figure 3A:
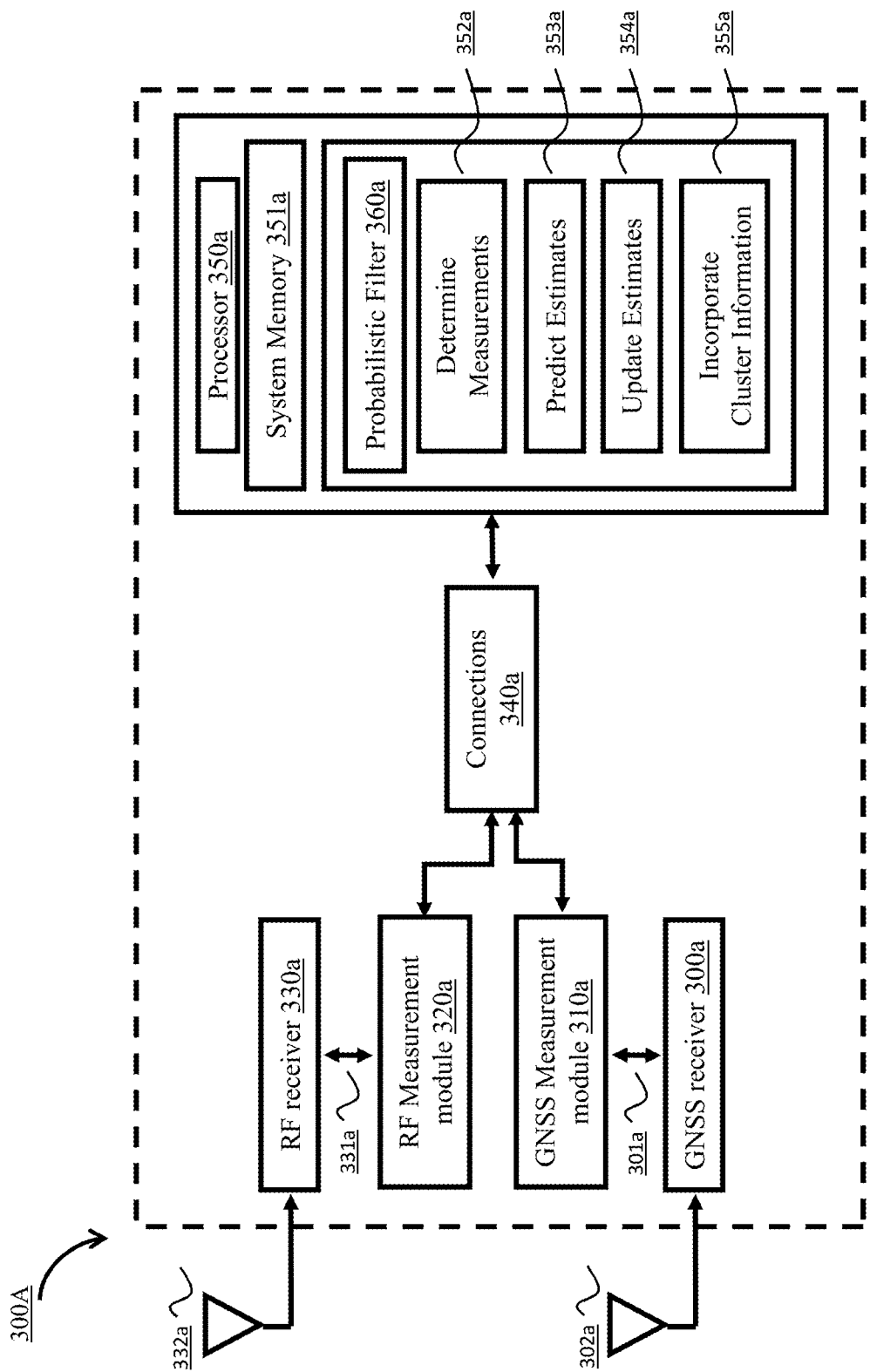
FIG. 3A shows a schematic of the information processing and communication done in one GNSS receiver equipped with a GNSS receiver in one embodiment.

FIG. 3A shows a schematic of the information processing and communication done in one GNSS receiver equipped with a GNSS receiver in one embodiment. In particular, FIG. 3A shows a probabilistic system 350*a* for tracking a state of an GNSS receiver using unsynchronized cooperation of information received from satellite signals 301*a* transmitted by a navigation satellite system (GNSS) and information transmitted over radio frequency (RF) channel 302*a* according to some embodiments. The probabilistic system includes a GNSS receiver 300*a* for receiving the satellite signals 301*a*. In one embodiment, the signals include code signals, carrier phase signals, time stamps, navigation messages, and observation messages needed to determine various delays and disturbances affecting the satellite signals. For instance, the navigation message can include parameters needed to determine atmospheric delays. For example, if the Klobuchar atmospheric delay model is used, the navigation message includes parameters for determining an ionospheric time delay according to the ionosphere's effect on the signal propagation determined by the atmospheric delay model. In other embodiments, such messages can include parameters for determining the ionospheric delay according to the SBAS delay model.

The system in FIG. 3A includes memory 351*a* that stores a probabilistic multi-head measurement model relating incoming measurements with the state of the GNSS receiver. In some embodiments, the multi-head measurement model consists of two heads. The first head relates measurements of the satellite signals with a belief on the state of the GNSS receiver subject to measurement noise. The second head relates an estimation of the state of the GNSS receiver with the belief on the state of the GNSS receiver subject to estimation noise. The memory also stores instructions on how to determine such relation, and the memory stores instructions stores to execute a probabilistic filter according to some embodiments of the invention. The memory also stores a probabilistic motion model relating a previous belief on the state of the GNSS receiver with a prediction of the state of the GNSS receiver according to the motion model. For example, the motion model can be a vehicle dynamics model, a constant acceleration model, a constant position model, a coordinated turn model, a Singer motion model, a kinematic vehicle model, a dynamic vehicle model, or a combination of different models.

In some embodiments, relating the measurements of the satellite signals with a belief of the state and relating the estimation of the state with the belief of the state is done by inserting said quantities into the first and second head, respectively, of the measurement model.

The GNSS receiver is operatively connected 301*a* to a GNSS measurement module 310*a*, which, after determining the above-mentioned delays and disturbances, determines the measurements of the satellite signals and the associated measurement noise. For instance, in one embodiment the measurement noise is computed based on a nominal measurement noise stored in the memory 351*a* scaled with a function of the elevation angle of the satellite.

The probabilistic system 300A includes an RF measurement module 320*a* that is operatively connected to an RF receiver 330*a* that receives information 332*a* transmitted over an RF channel. In some embodiments, the information 332*a* includes a first moment of the state of the GNSS receiver's estimate. In other embodiments, the information 332*a* includes the first moment and the second moment of an GNSS receiver's estimate. In other embodiments, the information 332*a* includes higher-order moments to form a general probability distribution of the state of the GNSS receiver. In other embodiments, the information 332*a* includes data indicative of an estimation of the state of the GNSS receiver 300*a* and the estimation noise, e.g., as samples, first and second moment, alternatively including higher-order moments. In yet other embodiments, the time of receiving the information is different from the time the information was determined. For example, in some embodiments, the active remote server includes instructions to determine first and second moments, and the execution of such instructions, coupled with a communication time between the remote server and the RF receiver 330*a*. To this end, in some embodiments, information 332*a* includes a timestamp of the time the first and second moments were determined.

In various embodiments, the GNSS measurement module 310*a* and the RF measurement module 320*a* produce estimates that relate to the belief on the state of the GNSS receiver 300*a* at an instance of time. For example, the GNSS signals are received and upon receiving the signals, a processor 350*a* determines measurements at a current time step 352*a*. However, in some implementations, the RF measurement module 320*a* receives the first and second moments of the state of the GNSS receiver determined for a previous time step, e.g., when said instructions of remote servers take time to execute. This leads to the determined measurement and the received first and second moments to not correspond to the same time instant.

To address this issue, using a motion model, some embodiments relate the first and second moments of the state of a previous time step with a belief of the state in a current time step in time to determine the estimation of the state indicative of the belief on the state of the GNSS receiver 300*a* at a current instance of time in 353*a*. For example, one embodiment propagates the first and second moments of the state of the GNSS receiver in time until a current instance of time using a model of time propagation, for example, the motion model stored in the memory 351*a*. Examples of the model of time propagation include a Singer motion model, a constant acceleration model, and a single-track vehicle model. Using both moments in time propagation is advantageous over propagating just a first moment because the propagation of uncertainty, hence how much the first moment should be trusted when updating the belief of the state, is considered. In other embodiments, the time propagation is done by a combination of a motion model of the GNSS receiver 300*a*, and the measurements acquired by the GNSS receiver 300*a*.

Regardless of the time instance of receiving the first and the second moments of the state of the GNSS receiver, there is a need to ensure that the estimation noise is constructed in such a way that when updating the parameters of probabilistic distribution with the estimate of the state subject to the measurement noise, the probability distribution of the belief of the state converges to the probability distribution of the received second moment of the state. To this end, some embodiments are based on the realization that the convergence property can be ensured by balancing covariances of the received second moment and the covariances of the probabilistic distribution of the current belief of the state. In other words, the estimation of the state and associated measurement noise is determined such that the balancing preserves convergence.

In some embodiments, the processor 350a executes a probabilistic filter 360a that is used to update the parameters of the predicted probabilistic distribution and based on the available measurements. This filter first determines which measurements to include in 352a, before predicting the estimates forward in time 353a and subsequently updating the estimates at the new time using the measurement information determined in 352a. In some embodiments, the estimate is further corrected by the incorporation of cluster-level information as a virtual measurement or direct reset of the estimate done in 354a.

Structuring the processing and estimation conducted in the GNSS receiver 300a in this way permits it to operate completely independently of the larger clustering service, enabling safe operation even during a complete loss of RF communication (assuming that there is no loss of the GNSS reception). Furthermore, the GNSS receiver 300a executes instructions just like a modern day GNSS receiver, with estimators such as those based in a nonlinear KF paradigm with integer fixation. The only difference is that the GNSS receiver 300a that participates in the cooperative positioning has the option of improving its own estimate through an estimate reinitialization or inclusion of a virtual measurement update based on the information received from the clustering service. In some embodiments, all GNSS receivers do not make this correction based on information from the designated cluster, but simply upload their estimates and measurements to aid other GNSS receivers' positioning endeavors.

Figure 3B:
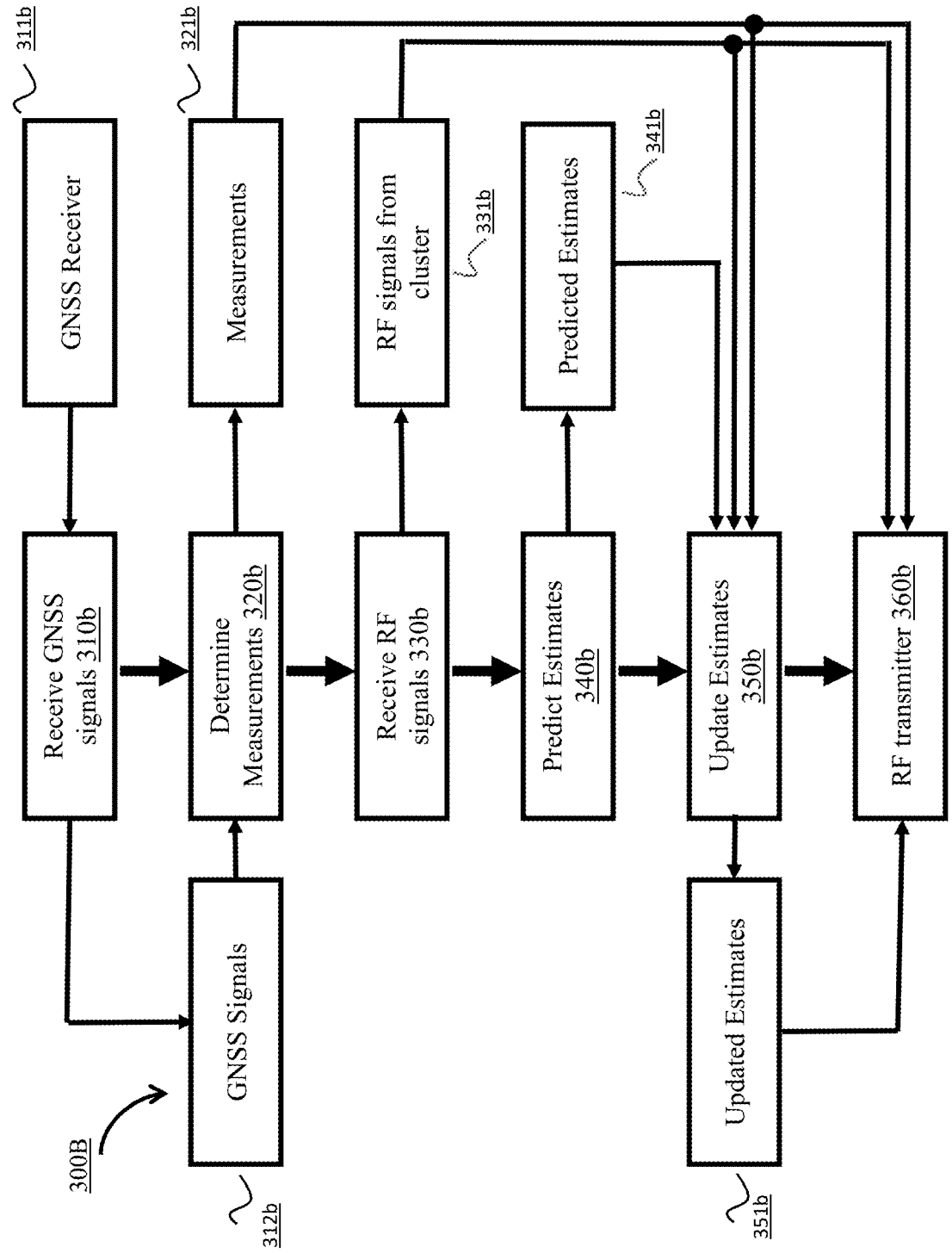
FIG. 3B shows a flowchart of a probabilistic filter used in one GNSS receiver equipped with a GNSS receiver in one embodiment.

FIG. 3B shows a flowchart 300B of a method of an exemplar implementation for state estimation executed in an GNSS receiver 311b, wherein the method receives 310b measurements and estimates of the states including the multi-head measurement model. Each carrier signal includes a carrier phase ambiguity as an unknown integer number of wavelengths of the carrier signal traveled between the satellite 110a, 111a, 112a, 113a, or 114a, and the receiver 131a or 130a. Next, the method retrieves from the memory 351a, a motion model relating a previous state of the vehicle to a current state of the vehicle and the multi-head measurement model relating measurements of the carrier and the code signals to the current belief of the state of the vehicle using the carrier phase ambiguities of the carrier signals and the estimation of the state of the vehicle to the belief of the state of the vehicle. Both models, i.e., the motion model and the measurement model are probabilistic. For example, the motion model is a probabilistic model subject to process noise, and the measurement model is a probabilistic model subject to measurement noise.

Next, the method determines the measurements to include in 320b based on algorithms operating on the representation of the probabilistic estimate distribution stored in the processor memory, and data provided in the GNSS signals. In some embodiments, these algorithms are implemented as thresholds operating on the signal to noise ratio of the GNSS signals, and the elevation angles of the satellites in 110a, 111a, 112a, 113a, or 114a, with respect to the position of the receiver. This forms a set of GNSS measurements in 321b, which are used to update the GNSS receiver's belief of its own state.

On some time steps of the probabilistic filter in 360a, additional information is received from the cluster to which the GNSS receiver 311b is assigned. This information can be provided in the form of an improved estimate or a measurement update that corrects the belief of the GNSS receiver's estimate, as stored in the GNSS receiver 311b, based on the belief of the GNSS receiver's state, as stored in the cluster. It is understood that the relative rates at which the estimate is updated and the delays in the RF communication between the GNSS receiver 311b and the cluster will influence if the information in the cluster will be incorporated as a reset of the estimate or a virtual measurement update. The RF signals from the cluster 331b information is received in 330b and stored in the memory 351a.

To update the belief of the state based on the received GNSS measurements in 321b, the state of the GNSS receiver 311b is predicted forward in time in 340b, producing a predicted estimate in 341b. Subsequently, a joint distribution between the predicted estimate 341b and the measurements 321b is computed, whereby the predicted estimate is updated by conditioning on the new measurement in 350b, resulting in an updated estimate in 351b. This updates the GNSS receiver's belief of its own state, and the parameters used to represent this belief in the memory 351a.

Several computational methods can be used to approximate the joint distribution of the predicted state of the GNSS receiver 311b and the measurements, such as Taylor expansions of the nonlinear functions by an explicit linearization, a statistical linearization, or direct evaluation of the moment integrals associated with the joint distribution. In one embodiment, the estimate distribution is represented as a Gaussian distribution, in which case the subsequent conditioning of the GNSS receiver's state on the new measurement 321b results in a KF update. The probabilistic filter executed in the GNSS receiver 311b is not limited to such representations and may include any probabilistic representation of the estimate distribution and associated methods of conditioning.

Finally, having computed the updated estimate 351b, this is stored in the memory 351a and used as the start of the prediction in 340b on the next time step of the probabilistic filter. This estimate, along with the RF measurements used in its computation, are both sent to the cluster associated with the GNSS receiver 311b in 360b, as determined by the RF signals received from the cluster.

Figure 4A:
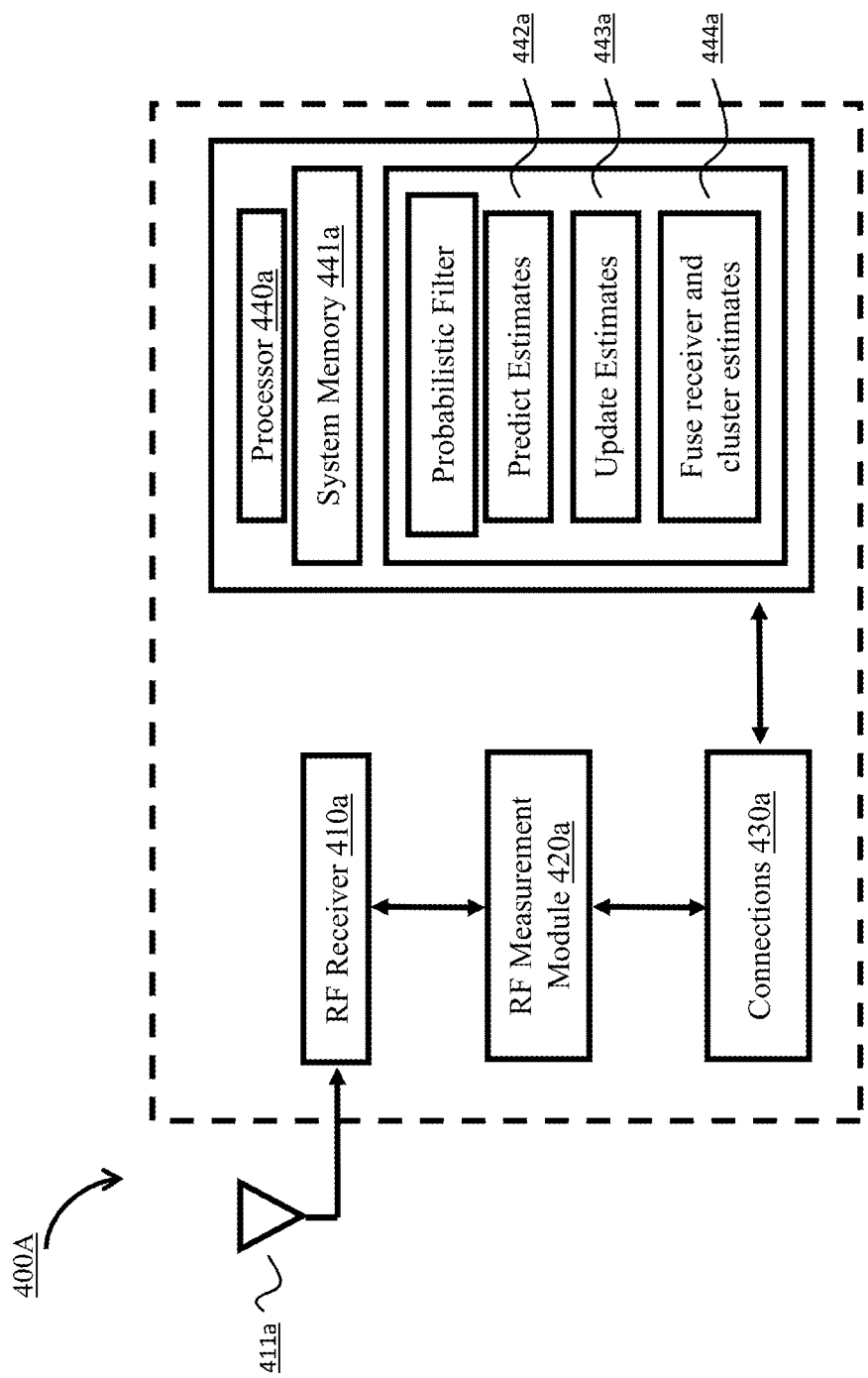
FIG. 4A shows a schematic of the information processing and communication done in one cluster of GNSS receivers, which receives the measurements of the GNSS receivers assigned to it.

FIG. 4A shows a diagram 400A of an internal representation of one of the clusters 220b, 223b, 224b, which is used for tracking one or more GNSS receivers assigned to the cluster using GNSS information transmitted over radio frequency (RF) channel 411a according to some embodiments. The system includes an RF receiver 410a and an RF measurement module 420a that is used to decode the signals along with connections 430a that transmit the information to a processor 440a. In one embodiment, the signals include code signals, carrier phase signals, time stamps, navigation messages, and observation messages needed to determine various delays and disturbances affecting the satellite signals from one or more GNSS receivers. In other embodiments, the RF signals only include the estimates computed in the GNSS receivers. In yet other embodiments, the RF signals additionally include information on the algorithm that is run in the GNSS receiver to resolve and update its belief of its state based on its measurement information.

To fuse the information transmitted to the clusters 220b, 223b, 224b, each cluster is associated with a processor, which in some embodiments may be shared among multiple clusters. The processor 440a includes a system memory 441a, which stores a probabilistic representation of the states of all the GNSS receivers assigned to a given cluster. This belief of the GNSS receiver's state is updated in time using a probabilistic filter, which operates with information from one or more GNSS receivers, and incorporates known relationships between the GNSS receivers, such as shared biases and correlated measurement noise. This improves the estimate in the clusters and is used to enhance the GNSS receivers' estimates of their own states.

To this end, the estimates computed by the cluster are fused with the estimates computed by the GNSS receivers, where the latter are transmitted to the cluster using the RF receiver 410a. Here, fusion is beneficial if there are time delays in communication, if the cluster and GNSS receivers update their estimates at different rates, or if the GNSS receiver has more measurement information than is sent to the cluster. For example, in some embodiments, there are inertial measurement units (IMUs) and other sensing on the GNSS receivers which produce measurement information at much faster rates than the update rate of the clusters. The estimates of the GNSS receivers and the estimate computed by the cluster are fused in 444a. This fusion can be done in several ways, including but not limited to regular and generalized Bar-Shalom-Campo fusion (BC and GBC), convex combinations (CC) of densities, covariance intersection (CI) and inverse covariance intersection (ICI), and general fusion based on convex optimization.

Here, the fusion methods can be understood in terms of information items, which is a distribution over a variable that has been estimated using some information. Two such information items, here taken to be Gaussian, as $N(\mu_A, \Sigma_A)$ and $N(\mu_B, \Sigma_B)$, can be fused into a fused information item, $N(\mu_f, \Sigma_f)$ producing an estimate that includes information from both information items. It is superior to use the BC and GBC fusion methods if the cross-covariance of the two information items is known, in which case the MSE optimal fusion is achieved. This is illustrated in FIG. 4C, where two information items 410c and 420c, are fused using BC, GBC, CI, and ICI with various rules determining the relative importance of the information items in the CI and ICI methods. All the methods produce sound fused information items, but the CI and ICI are conservative (the uncertainty in the fused estimate is larger) and the estimates computed using BC and GBC 430c are the same, both being optimal when knowing the cross-covariance of the information items.

It is understood that the best possible fusion in the Gaussian setting is achievable if knowing the cross-covariance between the information items that are being fused, and as such, some embodiments include a recursive estimator for computing this inter-information item or inter-GNSS receiver estimate error cross covariance.

Combining the local estimates with the estimates computed in the cluster permits the fused estimate to complement the local information known to each GNSS receiver in the cluster with known and modeled inter-GNSS receiver relationships, thereby enhancing the estimate of one GNSS receiver by the estimated behavior of another. This fusion can only be done in an approximate sense if assuming no knowledge of the inter-GNSS receiver estimate error covariances, which is why this cross-covariance between each GNSS receiver in each cluster needs to be estimated. However, it is understood that the above-described method could operate with fusion methods that disregard this inter-GNSS receiver cross covariance as well.

Figure 4B:
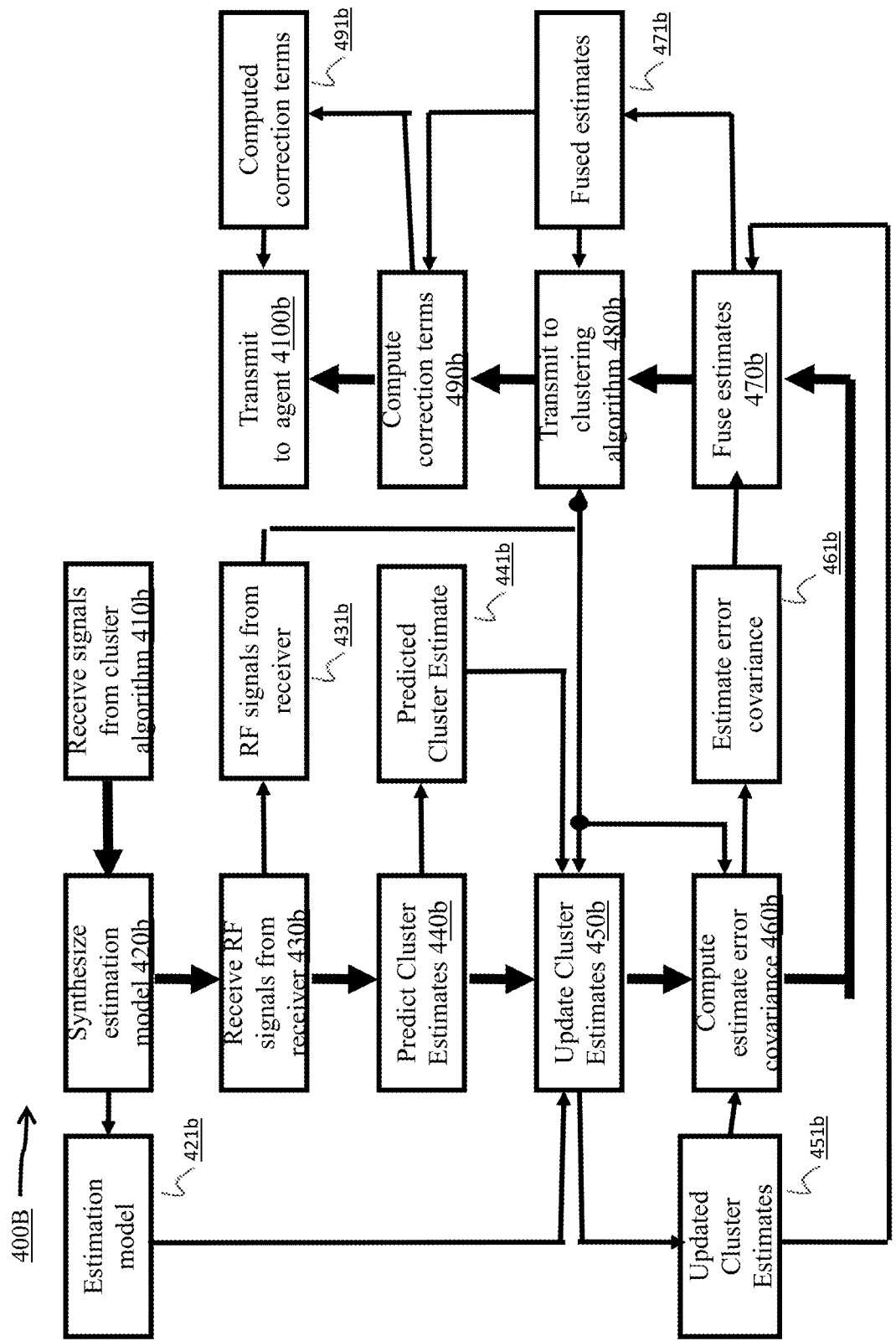
FIG. 4B shows a flowchart of the model synthesis and a resulting probabilistic filter used in one cluster, which receives the measurements of the GNSS receivers assigned to it.
Figure 4C:
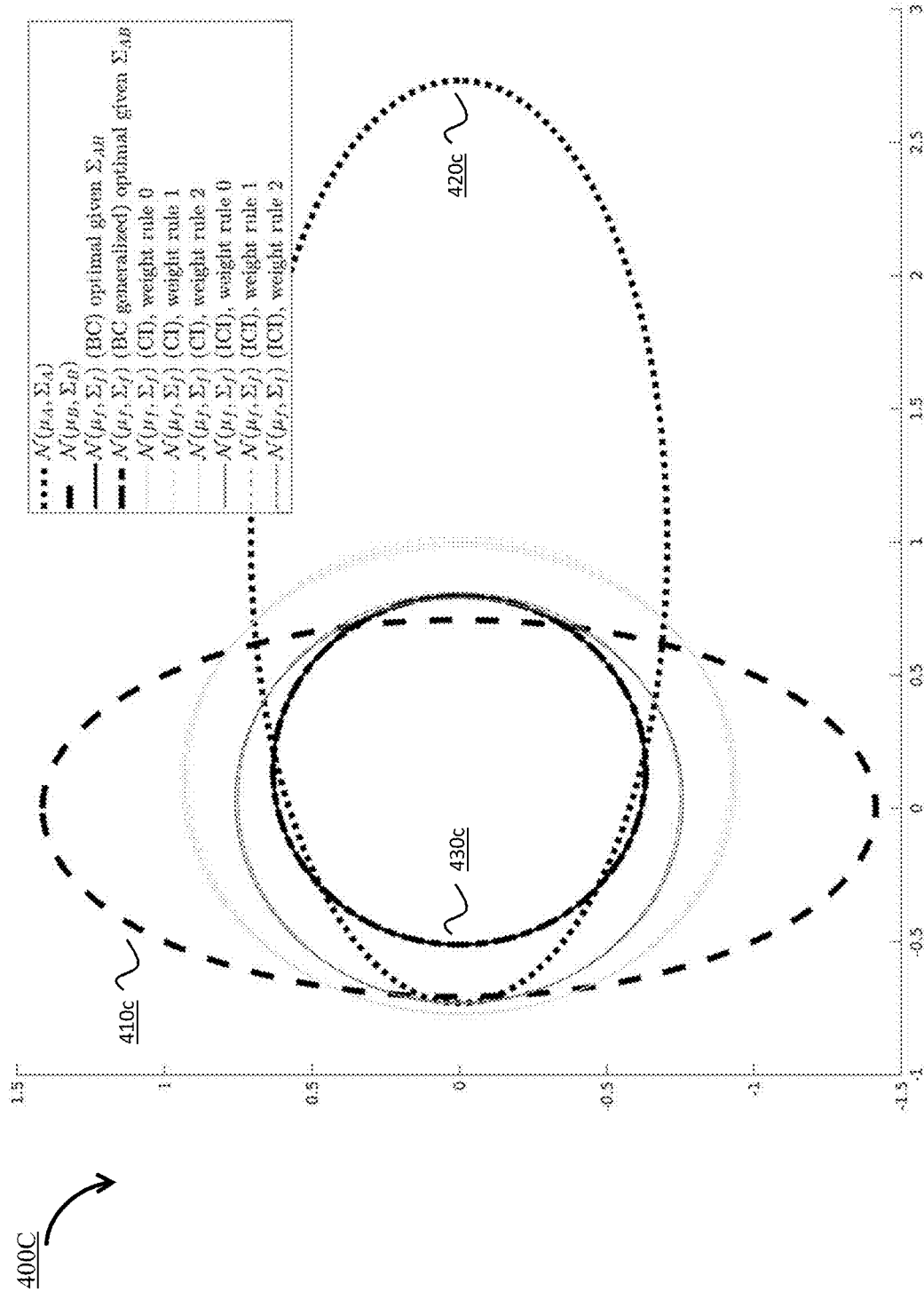
FIG. 4C illustrates how different clustering methods can be used to fuse two information items on the same state, producing different fused information items.

FIG. 4B shows a flowchart 400B of a method of an exemplar implementation for state estimation executed in a cluster, wherein the method receives signals 410b from the main cluster algorithm, detailing the GNSS receivers that should be included in said cluster and how the estimates therein should be initialized if the cluster has been modified. In one embodiment, these signals include the cluster representation as the integer vector, and in other embodiments the signals also include the first and second moments of the estimate distribution in the new cluster. Based on the clustering provided in 410b, an estimation model 421b for the cluster is synthesized in 420b. This estimation model 421b captures modeled inter-GNSS receiver measurement noise covariance resulting from the differencing operations used in GNSS positioning to mitigate errors. It also captures relationships between the states of the receivers, modeling any shared bias as the same state.

Next, the signals from the GNSS receivers incorporated 430b and used to further refine the estimation model. In one embodiment, this is done by only including the states that are observable in the measurements provided by the GNSS receivers in the cluster's state vector. Additionally, the dimension of the combined measurement vector is modified according to how the measurements were determined in 320b of each individual GNSS receiver.

To update the belief of the state based on the received GNSS measurements in 431b, the state of the cluster is predicted forward in time in 440b, producing a predicted estimate in 441b. Subsequently, a joint distribution between the predicted estimate 341b and the measurements 431b is computed, whereby the predicted estimate is updated by conditioning on the new measurement in 450b, resulting in an updated cluster estimate in 451b. This updates the cluster's belief of its assigned GNSS receiver's states, and the parameters used to represent this belief in a memory 541a.

Just as in the estimator run in each GNSS receiver, several computational methods can be used to approximate the joint distribution of the predicted state of the GNSS receiver and the measurements, such as Taylor expansions of the nonlinear functions by an explicit linearization, a statistical linearization, or direct evaluation of the moment integrals associated with the joint distribution. In one embodiment, the estimate distribution is represented as a Gaussian distribution, in which case the subsequent conditioning of the GNSS receiver's state on the new measurement 321b results in a KF update. The probabilistic filter executed in the clusters are not limited to such representations and may include any probabilistic representation of the estimate distribution and associated methods of conditioning. There may be different approximations used in computing the joint predicted joint distributions in each cluster, and these may in turn differ from the ways in which the predicted joint distributions are computed in each GNSS receiver.

To facilitate a fusion between the GNSS receivers' beliefs of their own states, and the cluster's belief of the GNSS receivers' states, several methods can be considered. These include but are not limited to generalized Bar-Shalom-Campo fusion, convex combinations of densities, covariance intersection and inverse covariance intersection, and general fusion based on convex optimization. To perform an optimal fusion, it may be necessary to compute the estimate error covariance between the estimate error in different GNSS receivers, as well as the estimate error covariance between the estimate entertained in an GNSS receiver and the estimate entertained in its designated cluster. In one embodiment, this computation is done recursively based on the Kalman gains used to update the estimates. In other embodiments, this estimate error covariance is computed empirically and reset every time the cluster is modified. The estimate error covariance is computed recursively in 460b based on the estimates provided in the RF signals from the GNSS receivers 431b and the updated cluster estimates 451b. The estimate error covariance, if required in the fusion algorithm, is stored in 461b.

The estimates are subsequently fused in 470b, where it is understood that the inter-GNSS receiver information available in computing the estimate of an GNSS receiver's state in the cluster complements the estimate of the same GNSS receiver's state computed in the GNSS receiver. However, it may be that the estimation done in the GNSS receiver is conducted at higher rates than the probabilistic filter run in the cluster, and it may also be that the GNSS receiver leverages additional information such as an inertial measurement unit (IMU) in resolving its own belief. As such, the estimate fusion in 470b is necessary to incorporate both the inter-GNSS receiver relationships and the additional information available to the GNSS receiver. In some embodiments, the fused estimate is defined in the state-space of the cluster, including all the states of the GNSS receivers that are assigned to the cluster. In some embodiments, this fused estimate is stored 471b and subsequently transmitted back to the clustering algorithm 480b.

In some embodiments, the clustering algorithm and the clusters are implemented on the same hardware, in which case the transmission in 410b and 480b can be implemented with joint access to shared memory, avoiding the need for RF communication between the cluster algorithm and the clusters.

Based on the fused estimates in 471b, a set of correction terms are computed in 490b. In some embodiments, where the GNSS receivers do not incorporate any information in addition to that which is sent to the cluster, and there the update rate of the probabilistic filter run in the GNSS receivers is sufficiently slow, these corrections terms in 471b map the estimate entertained in the cluster stats-pace to that of the GNSS receiver's state space. In this case, the correction terms are represented in the first two or more moments of the estimate distribution and can be used to directly reset the estimate in the GNSS receiver. In other embodiments, a virtual measurement is computed such that an update with the filter run in the GNSS receiver given said virtual measurement update will move the belief of the GNSS receiver's state to the belief of the GNSS receiver's state that is contained in the fused estimate of 471b. Finally, the correction terms in 491b are transmitted to the corresponding GNSS receiver in 4100b, using the receiver in 511a.

Figure 5A:
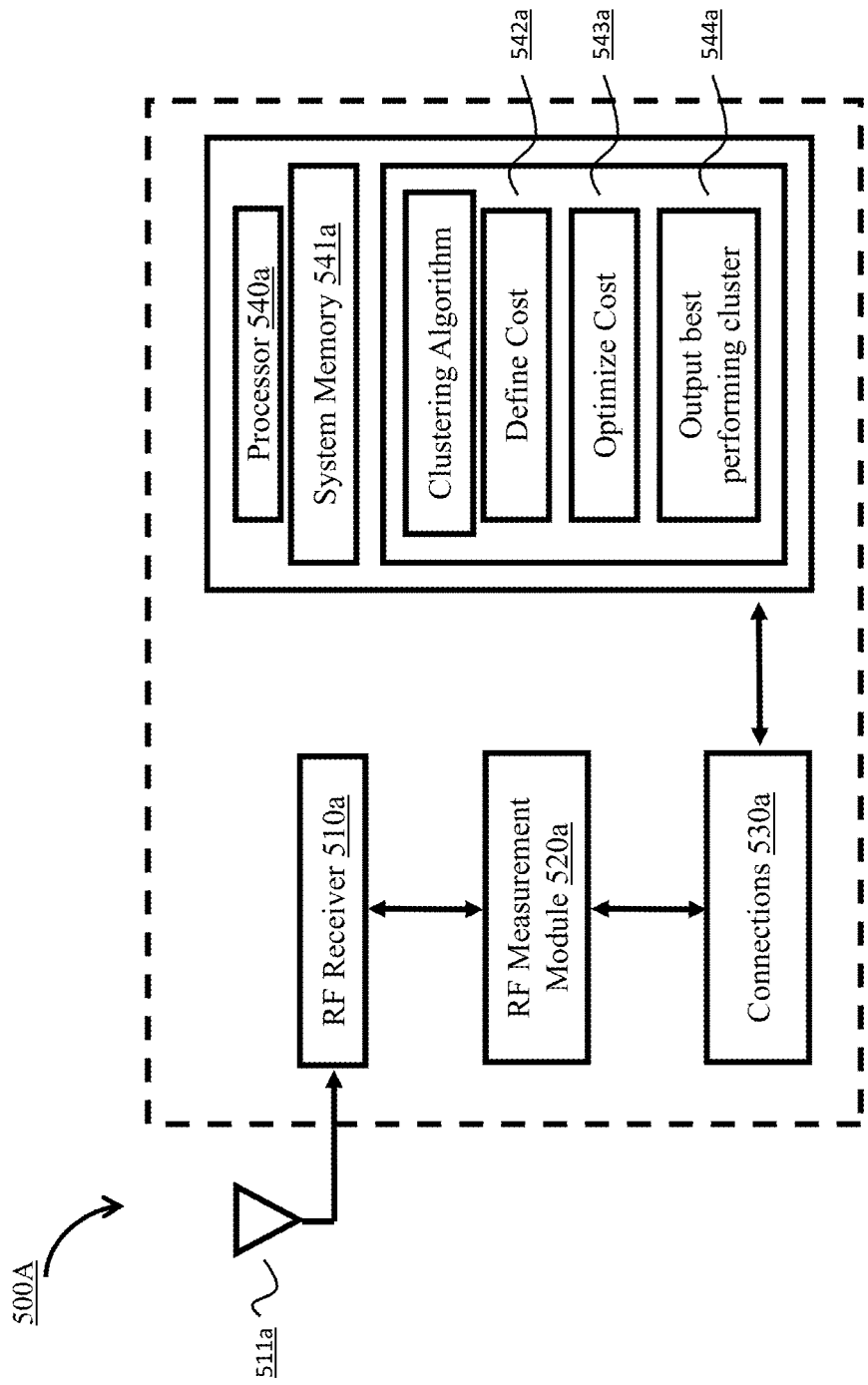
FIG. 5A shows a schematic of information processing and communication done in the central clustering algorithm, which assigns GNSS receivers to each individual cluster, adding and removing clusters as required.

FIG. 5A shows a diagram of a clustering method 500A implemented on a server, which takes information of the measurements and state estimates in the clusters and improves its internal representation of the optimal way to cluster the GNSS receivers. On a processor 540a, which executes the clustering method, there is a system memory 541a which stores a population of solutions which represent ways in which the GNSS receivers can be clustered. In some embodiments, this representation is an integer array. In this array, the $i^{th}$ element set to j indicates that the GNSS receiver $A_i$ should be processed in cluster $C_j$. In addition to a population of integer arrays, the memory contains a buffer where a history of the measurements in each GNSS cluster is stored, along with the estimates of each cluster over the same time. The processor executes an iterative optimization algorithm 550a with respect to a fitness function or cost 551a expressed over the possible ways of clustering the GNSS receivers. This cost is minimized in 552a, and the output of the clustering method consists of the best solution at any given iteration of the optimization algorithm in 553a.

Upon computing a new solution, the parameters of the resulting estimate distributions that were computed in evaluating the cost of the best solution are used to re-start the estimators in the clusters to whom new GNSS receivers have been assigned. As such, the RF receiver 511a communicates with the set of clusters, acquiring measurement information from each cluster and the parameters of its current estimate as outlined in FIG. 2C. In some embodiments, this RF communication is replaced by wired communication, and in other embodiments all the clusters and the clustering method are both hosted on the same server, in which case the connection illustrated in 511a is implemented in software by shared access to memory.

Clustering GNSS receivers in this manner effectively reduces the size of the estimation problem in each individual cluster, reducing the computational complexity of running the associated filters in each cluster. For the simplest of estimators, the number of floating-point operations used on each time step scales cubically in the number of measurements and states. As such, factoring a central estimation problem with 100 states into 10 smaller problems (run in each cluster) with 10 states each reduces the computational complexity of the problem by a factor proportional to 100. Consequently, the clustering method outlined above is needed to make cooperative positioning scalable, permitting the leveraging of information sharing among GNSS receivers while retaining a sufficiently small computational complexity to make the method capable of running in real-time.

Figure 5B:
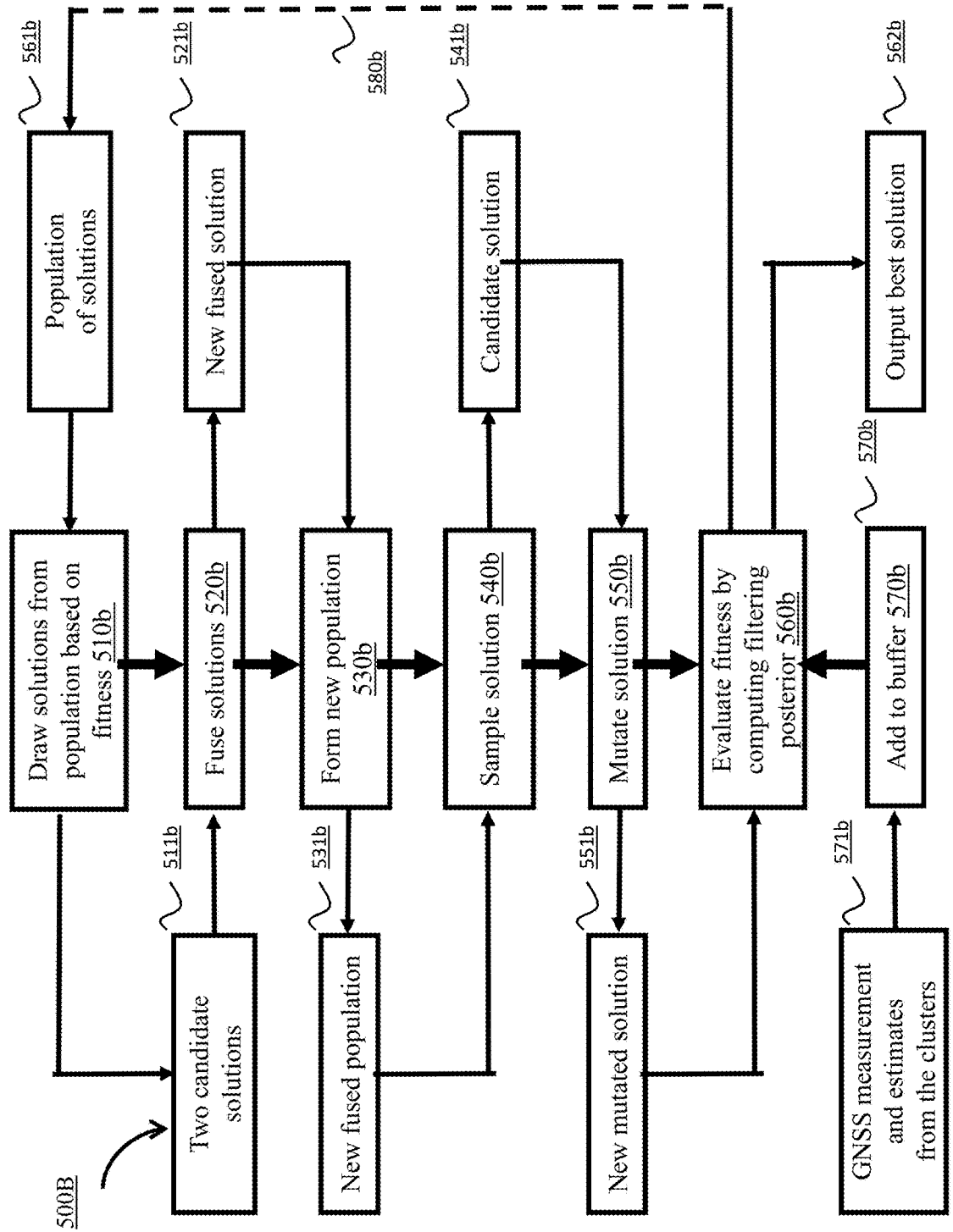
FIG. 5B shows a flowchart of the genetic algorithm used to iteratively solve the clustering problem in one of the embodiments.
Figure 5C:
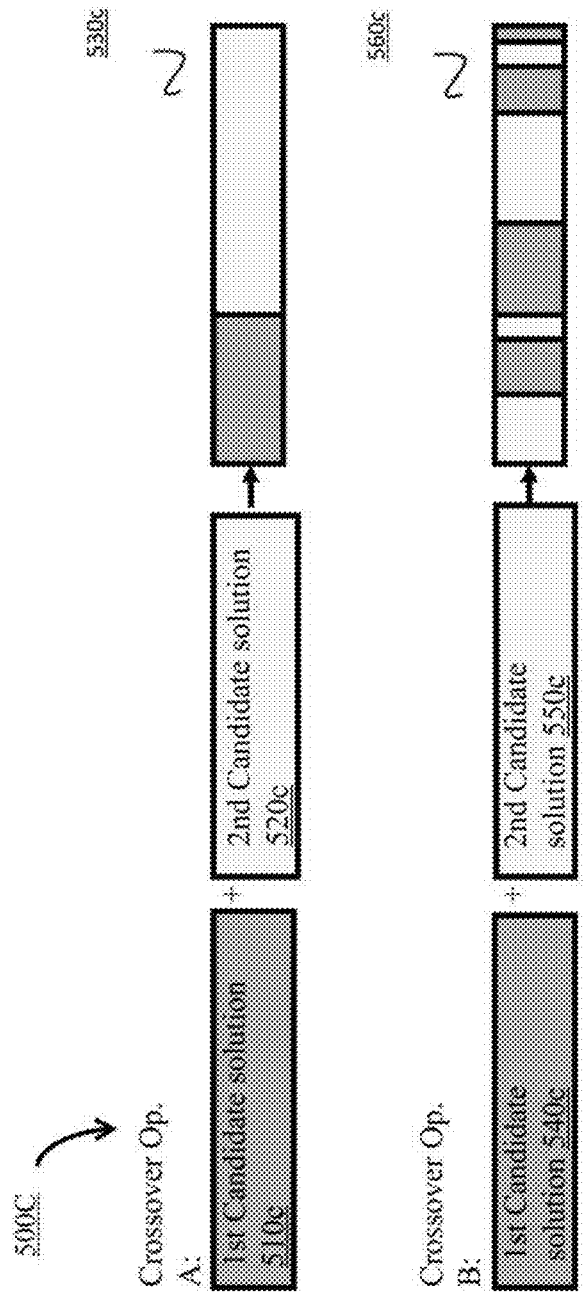
FIG. 5C shows a schematic of the cross-over operations used in one embodiment of the iterative optimization algorithm used to compute how to cluster the GNSS receivers.

FIG. 5B shows a flowchart 500B of the genetic algorithm used to iteratively solve the clustering problem in one of the embodiments. In FIG. 5B one embodiment of an iterative optimization procedure is depicted in terms of a genetic algorithm (GA), which stores a set of solutions as described in 561b. From this population of solutions, two candidates are sampled in 511b, and fused by a set of crossover operations. These operations combine two candidate solutions to a new solution subject to the feasibility constraints in 520b, resulting in a new fused solution in 521b. These new fused solutions are combined in 530b to form the new fused population in 531b. Many different operations can be considered for cross-over operation, two of which are depicted in FIG. 5C. These include randomly combining the first portion of one solution 510c with the last portion of another 520c, resulting in a fused solution 530c. Another crossover operation consists of randomly sampling elements from the integer solution arrays 540c and 550c resulting in the fused solution in 560c. This last operation randomly assigns the GNSS receiver to one of the two associated clusters represented in the candidate solutions.

Figure 5D:
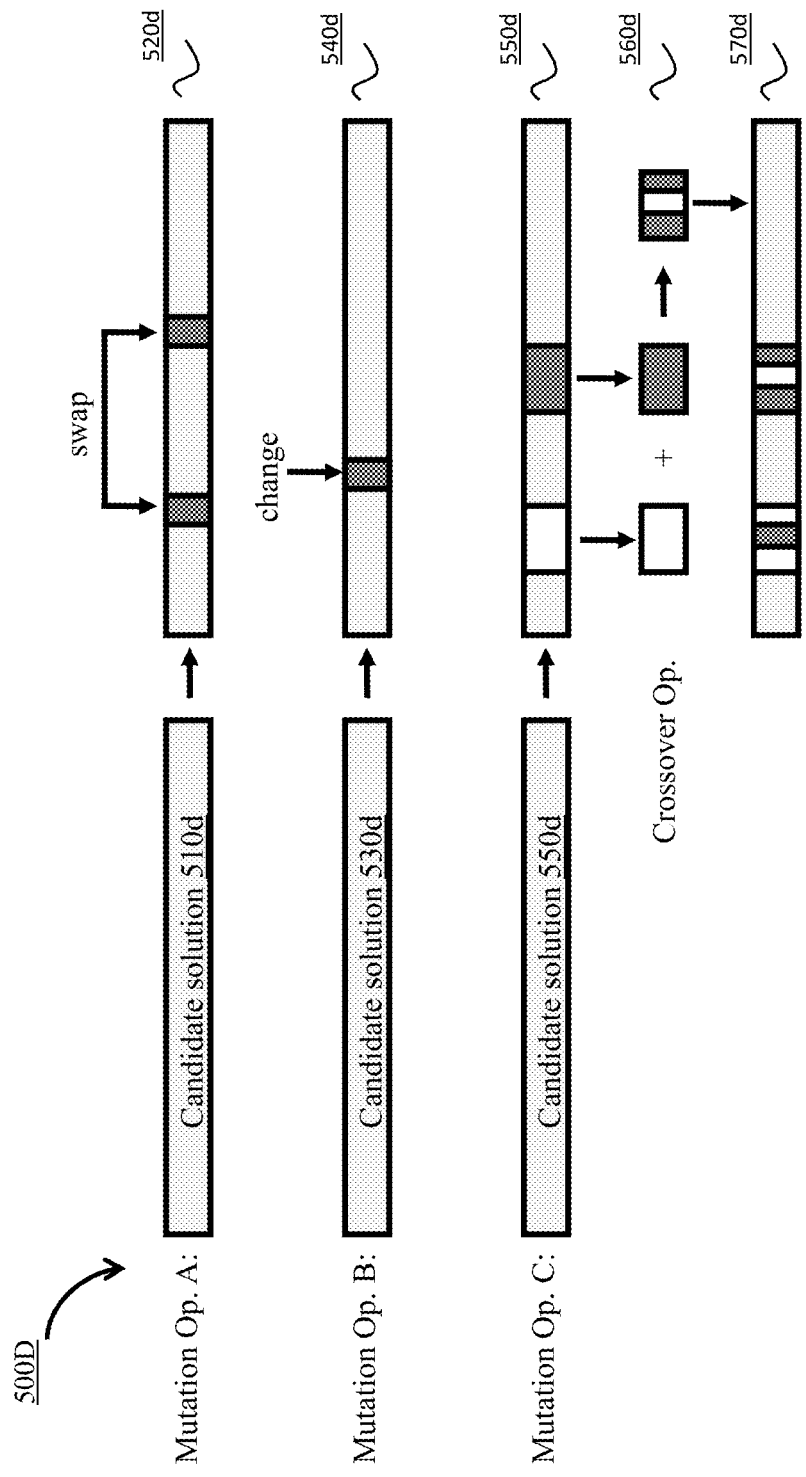
FIG. 5D shows a schematic of the mutation operations used in one embodiment of the iterative optimization algorithm used to compute how to cluster the GNSS receivers.

It is understood that convergence of the optimization algorithm may be slow if only permitting such cross-over operations. To speed up the convergence of the clustering algorithm, the new fused solution in 531b is sampled in 540b to yield a new candidate solution in 541b. This candidate solution is subjected to a mutation operation in 550b, which returns a feasible solution subject to the problem constraints in 551b. Many different mutation operations can be considered and differ from the crossover operations in 520b in that they operate on a single solution candidate. Three such mutation operations are depicted in FIG. 5D. These include setting a random element in the candidate solution 510d to a random integer in the interval from 1 to the number of clusters M resulting in a new mutated solution 520d. The second mutation operation involves swapping the positions of two random elements in candidate solution 530d resulting in a new mutated solution 540d. The third mutation operation applies the crossover operations to two random subsets of the candidate solution in 550d, corresponding to two separate clusters. These two clusters are subjected to one of the crossover operations resulting in 560d, which subsequently replaces the clusters in the original solution, yielding the mutated solution in 570d.

In some embodiments, concerning the cross-over and mutation operations in FIG. 5C and FIG. 5D only return a new solution if it is feasible subject to the maximum number of states and measurements that is permitted in each cluster. As such, every solution in every population on every iteration of the optimization method is feasible and will result in acceptable computational burdens in each cluster.

When applying the mutations, it is possible that clusters may vanish or that new ones need to be created depending on the number of participating GNSS receivers and satellite coverage. Both will determine the total number of states and measurements in the estimation problem, which may vary in time. As such, one embodiment implements all the clusters in software in a server, meaning that the clusters in 221b-223b are present in the same computing device or server. The clusters can also be implemented on separate computers, in which case the removal of a server implies that the associated computer enters an idle state, and the addition of a server implies that a computer wakes up from an idle state to perform the necessary processing.

To assess the performance of the new mutated solution in 551b, it is evaluated with respect to a fitness function in 560b. This evaluation is done by running the probabilistic filter in the resulting clusters that have been modified on a short segment of historical GNSS data 571b that is stored in a filter buffer 570b. This permits the evaluation of the effects of clustering at a current time, based on a proposed change to the clustering that has taken place in the past. If the fitness function is expressed as a function of mean squared error (MSE) and the estimators are consistent and unbiased, the effect of clustering in accordance with a new mutated solution can be expressed in the posterior of the state estimate computed using said clustering, as $E[\|x_k - \bar{x}_k\|^2] = E[\text{Trace}((x_k - \bar{x}_k)(x_k - \bar{x}_k)^T)] = \text{Trace}(P_k)$, and may subsequently be mapped to any fitness function expressed in the MSE of the estimate.

In one embodiment, the cost is comprised of a linear combination of the average MSE across all the GNSS receivers, $J_G(I)$, the average MSE in the GNSS receivers of the worst performing cluster, $J_C(I)$, and the MSE of the worst performing GNSS receiver, $J_L(I)$. These costs are defined as $$J_G(I) = \left(\sum_i^m N(C_i)\right)^{-1} \sum_i^m MSE(\bar{x}^i, \hat{x}^i),$$

$J_C(I) = \max_j (|C_j| d)^{-1} \text{ MSE}(\overline{H_j \bar{x}^j}, H_j \hat{\bar{x}}^j),$ $J_L(I) = \max_j \max_i d^{-1} \text{ MSE}(H_{ij} \bar{x}^j, H_{ij} \hat{\bar{x}}^j),$ which are weighed by a set of positive parameters $a_G$, $a_C$, $a_L \geq 0$. Here, d denotes the dimension of the positional subspace of each receiver. The map $H_j$ extracts the part of the estimates in cluster j that corresponds to the positional states of the estimate entertained in the cluster $C_j$. The map $H_{ij}$ extracts the positional part of GNSS receiver $A_i$ if this GNSS receiver is contained in the cluster $C_j$. As such, a combined fitness function is formed as $J(I) = \alpha_G J_G(I) + \alpha_C J_C(I) + \alpha_L J_L(I),$ The costs $J_G$ (I) and $J_C$(I) effectively act as regularizing terms on the cost, $J_L$(I), that in the GNSS positioning problem often is the most interesting term to minimize, permitting incremental improvements of the solution even when the mutation operations apply to clusters not containing the worst performing GNSS receiver. However, with the appropriate weighting, the cost function J(I) can be made the same as the cost function that would be optimized in a completely centralized KF.

It is understood that only the clusters that have been modified need to be simulated over the buffer in 570b to reassess the effects on the estimate performance. In some embodiments, the evaluation of the fitness function and application of the mutation operations are distributed among multiple computers and servers, as these operations are entirely parallelizable. It is also understood that unlike the processing in the GNSS receivers and clusters that need to be done in real time, some embodiments run the parallel processing in the clustering algorithm in FIG. 5B in quasi-real time, slowing down the execution of the clustering algorithm only results in a slower convergence rate of fitness as a function of time.

Upon computing the fitness for each candidate solution, the solutions are sorted according to fitness and propagated to the next generation represented by the dashed line in 580b, replacing the population of solutions in 561b. Finally, the best solution present in the population, I*, is transmitted to the clusters and used to assign the GNSS receivers to the clusters, defining how the information is permitted to be shared among the receivers and the estimation models that are used for the joint estimation problem in each cluster.

Figure 6:
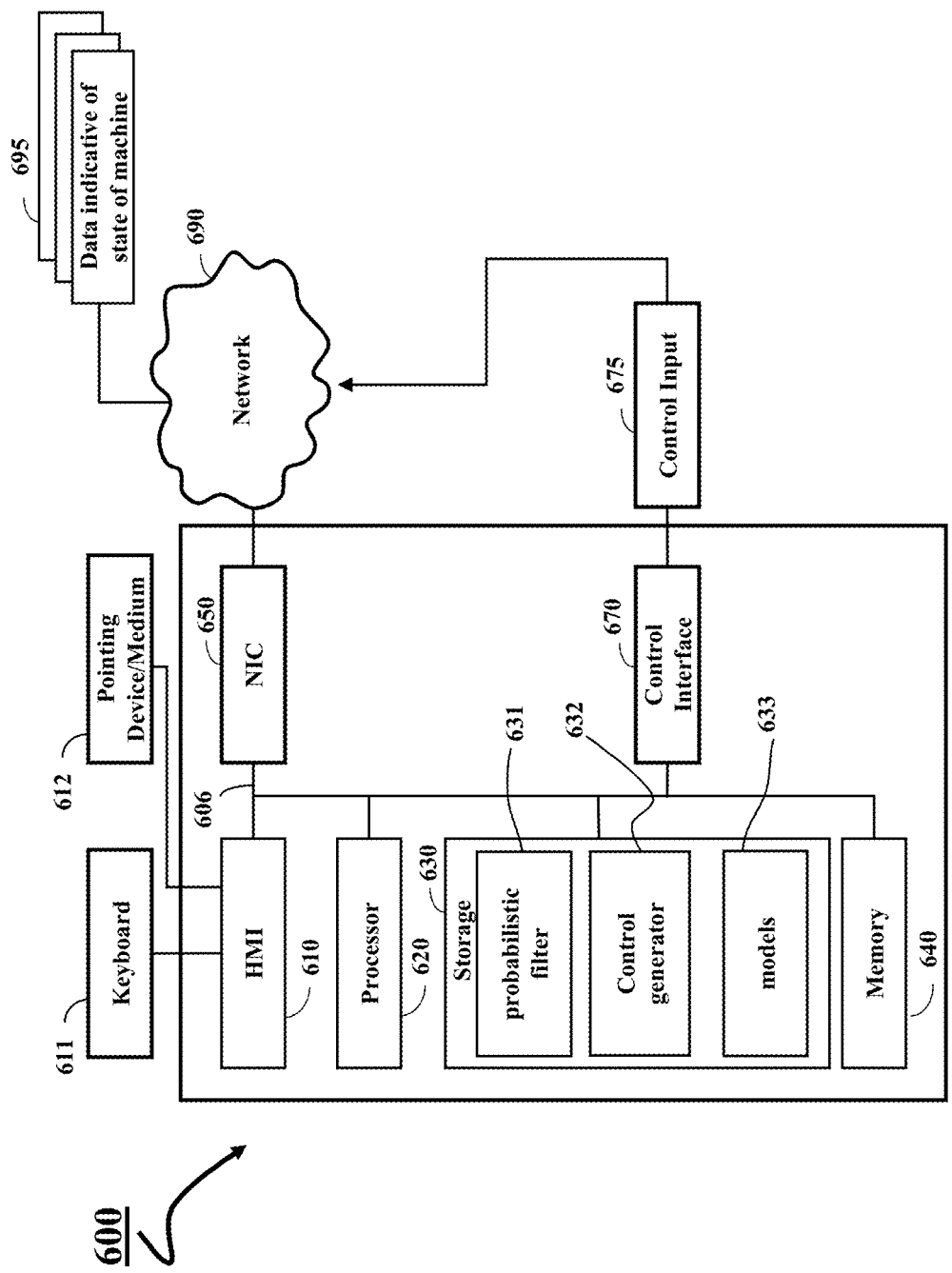
FIG. 6 shows a block diagram of a DES for tracking mixed-autonomy vehicles in accordance with some embodiments.

FIG. 6 shows a block diagram of a system 600 for joint tracking and/or control of moving devices such as vehicles in accordance with some embodiments. The system 600 can be arranged on a remote server as part of RSU to control the passing of mixed-automata vehicles including autonomous, semiautonomous, and/or manually driven vehicles. The system 600 can have a number of different interfaces connecting the system 600 with other machines and devices. A network interface controller (NIC) 650 includes a receiver adapted to connect the system 600 through a bus 606 to a network 690 connecting the system 600 with the mixed-automata vehicles to receive GNSS data from the vehicles.

In some implementations, the DES system is configured only to track the state of the vehicles. Additionally or alternatively, the DES is configured to further control the motion of the vehicle either individually or as a platoon. To that end, in some embodiments, the DES system 600 is configured to receive the traffic state of a group of mixed-autonomy vehicles traveling in the same direction, wherein the group of mixed-autonomy vehicles includes controlled vehicles willing to participate in a platoon formation and at least one uncontrolled vehicle, and wherein the traffic state is indicative of a state of each vehicle in the group and the controlled vehicle. For example, in one embodiment the traffic state includes current headways, current speeds, and current acceleration of the mixed-automata vehicles. In some embodiments, the mixed-automata vehicles include all uncontrolled vehicles within a predetermined range from flanking-controlled vehicles in the platoon.

The NIC 650 also includes a transmitter adapted to transmit the control commands to the controlled vehicles via the network 690. To that end, the system 600 includes an output interface, e.g., a control interface 670, configured to submit the control commands 675 to the controlled vehicles in the group of mixed-autonomy vehicles through the network 690. In such a manner, the system 600 can be arranged on a remote server in direct or indirect wireless communication with the mixed-automata vehicles.

The system 600 can also include other types of input and output interfaces. For example, the system 600 can include a human-machine interface 610. The human-machine interface 610 can connect a controller to a keyboard 611 and a pointing device 612, wherein the pointing device 612 can include a mouse, trackball, touchpad, joystick, pointing stick, stylus, or touchscreen, among others.

The system 600 includes a processor 620 configured to execute stored instructions, as well as a memory 640 that stores instructions that are executable by the processor. The processor 620 can be a single-core processor, a multi-core processor, a computing cluster, or any number of other configurations. The memory 640 can include random access memory (RAM), read-only memory (ROM), flash memory, or any other suitable memory machines. The processor 620 can be connected through the bus 606 to one or more input and output devices.

The processor 620 is operatively connected to a storage 630 storing the instructions as well as processing data used by the instructions. The storage 630 can form a part of or be operatively connected to the memory 640. For example, the storage 630 can be configured to store probabilistic filters 631, clustering modules 633, and, optionally, control generator 632.

The processor 620 is configured to determine control commands for the controlled vehicles that indirectly control the uncontrolled vehicles as well. To that end, the processor is configured to execute a control generator 632 to determine control commands based on the state of the vehicles. In some embodiments, the control generator 632 uses a deep reinforcement learning (DRL) controller trained to generate control commands from the augmented state for an individual and/or a platoon of vehicles.

Figure 7A:
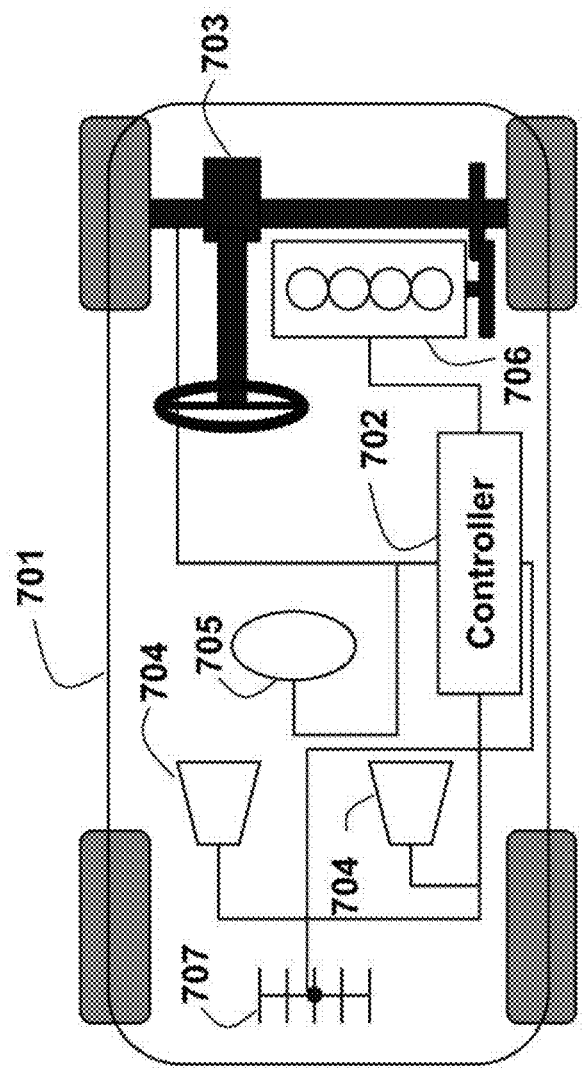
FIG. 7A shows a schematic of a vehicle controlled directly or indirectly according to some embodiments.

FIG. 7A shows a schematic of a vehicle 701 controlled directly or indirectly according to some embodiments. As used herein, vehicle 701 can be any type of wheeled vehicle, such as a passenger car, bus, or rover. Also, vehicle 701 can be an autonomous or semi-autonomous vehicle. For example, some embodiments control the motion of vehicle 701. Examples of the motion include the lateral motion of the vehicle 701 controlled by a steering system 703 of the vehicle 701. In one embodiment, the steering system 703 is controlled by the controller 702 in communication with the system 600. Additionally or alternatively, the steering system 703 can be controlled by a driver of vehicle 701.

The vehicle can also include an engine 706, which can be controlled by the controller 702 or by other components of the vehicle 701. The vehicle 701 can also include one or more sensors 704 to sense the surrounding environment. Examples of the sensors 704 include distance range finders, radars, lidars, and cameras. The vehicle 701 can also include one or more sensors 705 to sense its current motion quantities and internal status. Examples of the sensors 705 include global positioning system (GPS), accelerometers, inertial measurement units, gyroscopes, shaft rotational sensors, torque sensors, deflection sensors, pressure sensor, and flow sensors. The sensors 704 and 705 provide information to the controller 702. The vehicle 701 can be equipped with a transceiver 707 enabling communication capabilities of the controller 702 through wired or wireless communication channels.

Figure 7B:
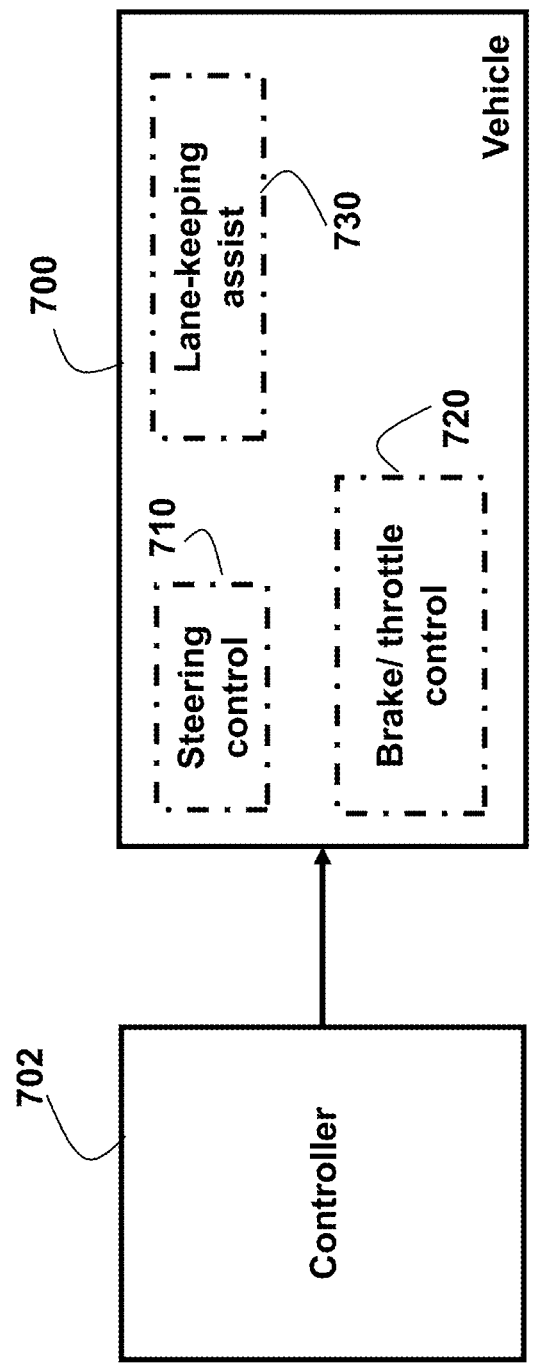
FIG. 7B shows a schematic of interaction between the controller receiving controlled commands from the system and the controllers of the vehicle according to some embodiments.

FIG. 7B shows a schematic of interaction between the controller 702 receiving controlled commands from the system 600 and the controller 700 of the vehicle 701 according to some embodiments. For example, in some embodiments, the controllers 700 of the vehicle 701 are steering 710 and brake/throttle controllers 720 that control rotation and acceleration of the vehicle 701. In such a case, the controller 702 outputs control inputs to the controllers 710 and 720 to control the state of the vehicle. The controllers 700 can also include high-level controllers, e.g., a lane-keeping assist controller 730 that further processes the control inputs of the controller 702. In both cases, the controllers 700 maps use the outputs of the controller 702 to control at least one actuator of the vehicle, such as the steering wheel and/or the brakes of the vehicle, to control the motion of the vehicle. States $x_t$ of the vehicular machine could include position, orientation, and longitudinal/lateral velocities; control inputs $u_t$ could include lateral/longitudinal acceleration, steering angles, and engine/brake torques. State constraints on this system can include lane-keeping constraints and obstacle avoidance constraints. Control input constraints may include steering angle constraints and acceleration constraints. Collected data could include position, orientation, velocity profiles, accelerations, torques, and/or steering angles.

The above-described embodiments of the present invention can be implemented in numerous ways. For example, the embodiments may be implemented using hardware, software, or a combination thereof. When implemented in software, the software code can be executed on any suitable processor or collection of processors, whether provided on a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of several suitable programming languages and/or programming or scripting tools and may be compiled as executable machine language code or intermediate code that is executed on a framework or virtual machine. Typically, the functionality of the program modules may be combined or distributed as desired in various embodiments.

In addition, the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A distributed estimation system (DES) for jointly estimating states of a plurality of GNSS receivers moving in a region using measurements of a Global Navigation Satellite System (GNSS), wherein each of the moving GNSS receivers is equipped with a GNSS transceiver configured to receive GNSS measurements and transmit GNSS data including one or a combination of the GNSS measurements and derivative of the GNSS measurements, the DES comprising: at least one processor; and the memory having instructions stored thereon that, when executed by the at least one processor, cause the DES to:
  collect the GNSS data transmitted by the plurality of GNSS receivers over a wireless communication channel;
  cluster the plurality of GNSS receivers into a set of different clusters subject to a constraint indicative of an upper bound on several GNSS receivers in each cluster defining computational complexity of jointly estimating the states of the GNSS receivers assigned to each cluster;
  execute a set of probabilistic filters corresponding to the set of clusters to estimate the states of GNSS receivers in one cluster independently from estimating states of the GNSS receivers in other clusters, wherein a probabilistic filter estimates the states of the GNSS receivers in a corresponding cluster by fusing the GNSS data collected from the GNSS receivers in the cluster to jointly reduce an estimation error of each of the GNSS receivers in the cluster;
  update the clusters of the plurality of GNSS receivers based on a measure of estimation error in the states of different GNSS receivers in different clusters subject to a computational constraint; and
  transmit the tracked states to the corresponding GNSS receivers.

2. The DES of claim 1, wherein to update the clusters, the processor is configured to:
  compare the estimation errors of the states of different GNSS receivers in different clusters to produce a result of comparison; and
  update the clusters of the plurality of GNSS receivers based on the result of the comparison.

3. The DES of claim 1, wherein to update the clusters, the processor is configured to:
  reassign a GNSS receiver with the largest estimation error among the plurality of GNSS receivers to a different cluster.

4. The DES of claim 1, wherein to update the clusters, the processor is configured to:
  exchange cluster assignments of a GNSS receiver with the largest estimation error in one cluster with a GNSS receiver with the smallest estimation error in a different cluster.

5. The DES of claim 1, wherein to update the clusters, the processor is configured to:
  perform a simulation of different assignments of the plurality of GNSS receivers to different clusters and a simulation of estimating the state of the GNSS receivers for different simulated assignments to receive collections of simulated estimation errors for different clusters;
  compare the simulated estimation errors with the estimation error of estimating the state of each of the GNSS receivers to produce a result of comparison; and
  update the clusters of the plurality of GNSS receivers based on the result of the comparison.

6. The DES of claim 1, wherein the measure of estimation error is an MSE computed in the posterior of a corresponding state estimate.

7. The DES of claim 6, wherein to update the clusters, the processor is configured to evaluate a fitness function defining a cost of the clustering based on one or a combination of an average MSE across the plurality of GNSS receivers, an average MSE of the GNSS receivers in a worst-performing cluster, and the MSE of a worst-performing GNSS receiver.

8. The DES of claim 7, wherein the fitness function is evaluated by computing empirical statistics of the estimation errors over a time interval.

9. The DES of claim 7, wherein the fitness function is minimized using an iterative optimization over the set of clusters.

10. The DES of claim 7, wherein the fitness function is minimized using a genetic algorithm (GA), and the fitness is evaluated only in the clusters that were affected by a given mutation.

11. The DES of claim 7, wherein to implement the genetic algorithm, the processor is made to sample solutions from the GA population; performs cross-over operations to combine pairs of solutions given a set of such instructions defined on the processor, only returning a candidate solution if it is feasible given the computational constraints used to define the clustering problem; performs mutation operations to permute single solutions given a set of such instructions defined on the processor, only returning a candidate solution if it is feasible given the computational constraints used to define the clustering problem; evaluate the fitness of the new candidate solutions based on how the clusters were modified and output the best solution in the population.

12. The DES of claim 1, wherein the DES includes multiple processors concurrently executing the set of probabilistic filters.

13. The DES of claim 1, wherein each of the probabilistic filters includes a Kalman filter estimating the states of the GNSS receivers, wherein each Kalman filter includes a stochastic prediction model and a multi-head measurement model subject to measurement noise, by which the GNSS data of the GNSS receivers in the cluster can be fused.

14. The DES of claim 1, wherein the GNSS receiver is a vehicle moving in the controlled zone of a roadside unit (RSU) implementing the DES.

15. The DES of claim 13, wherein the DES is configured to communicate with at least some of the vehicles over the wireless channel to control their movement.

16. The DES of claim 13, wherein the measurements and estimates of the GNSS receivers and clusters are fused in each individual cluster.

17. A method for jointly estimating states of a plurality of GNSS receivers moving in a region using measurements of a Global Navigation Satellite System (GNSS), wherein each of the moving GNSS receivers is equipped with a GNSS transceiver configured to receive GNSS measurements and transmit GNSS data including one or a combination of the GNSS measurements and derivative of the GNSS measurements, wherein the method uses a processor coupled with stored instructions implementing the method, wherein the instructions, when executed by the processor carry out steps of the method, comprising:
  collecting the GNSS data transmitted by the plurality of GNSS receivers over a wireless communication channel;
  clustering the plurality of GNSS receivers into a set of different clusters subject to a constraint indicative of an upper bound on several GNSS receivers in each cluster defining computational complexity of jointly estimating the states of the GNSS receivers assigned to each cluster;
  executing a set of probabilistic filters corresponding to the set of clusters to estimate the states of GNSS receivers in one cluster independently from estimating states of the GNSS receivers in other clusters, wherein a probabilistic filter estimates the states of the GNSS receivers in a corresponding cluster by fusing the GNSS data collected from the GNSS receivers in the cluster to jointly reduce an estimation error of each of the GNSS receivers in the cluster;

updating the clusters of the plurality of GNSS receivers based on a measure of estimation error in the states of different GNSS receivers in different clusters subject to a computational constraint; and transmitting the tracked states to the corresponding GNSS receivers.

18. A non-transitory computer-readable storage medium embodied thereon a program executable by a processor for performing a method for jointly estimating states of a plurality of GNSS receivers moving in a region using measurements of a Global Navigation Satellite System (GNSS), wherein each of the moving GNSS receivers is equipped with a GNSS transceiver configured to receive GNSS measurements and transmit GNSS data including one or a combination of the GNSS measurements and derivative of the GNSS measurements, the method comprising:

collecting the GNSS data transmitted by the plurality of GNSS receivers over a wireless communication channel;

clustering the plurality of GNSS receivers into a set of different clusters subject to a constraint indicative of an upper bound on several GNSS receivers in each cluster defining computational complexity of jointly estimating the states of the GNSS receivers assigned to each cluster;

executing a set of probabilistic filters corresponding to the set of clusters to estimate the states of GNSS receivers in one cluster independently from estimating states of the GNSS receivers in other clusters, wherein a probabilistic filter estimates the states of the GNSS receivers in a corresponding cluster by fusing the GNSS data collected from the GNSS receivers in the cluster to jointly reduce an estimation error of each of the GNSS receivers in the cluster;

updating the clusters of the plurality of GNSS receivers based on a measure of estimation error in the states of different GNSS receivers in different clusters subject to a computational constraint; and transmitting the tracked states to the corresponding GNSS receivers.

* * * * *